US012684242B2

(12) United States Patent
      Burns et al.

(10) Patent No.:      US 12,684,242 B2
(45) Date of Patent:          Jul. 14, 2026

(54) VEHICLE CAMERA SYSTEM

(71) Applicant: Rivian IP Holdings, LLC, Irvine, CA (US)

(72) Inventors: Geoffrey Francis Burns, Palo Alto, CA (US); Sreenivasulu Gosangi, San Ramon, CA (US); Michael Adkins Knott, San Mateo, CA (US); Krishna Kumar Madaparambil, San Jose, CA (US); Vishwas Venkatachalapathy, Newark, CA (US); Vinay Palakkode, Santa Clara, CA (US); Vikram Appia, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 73 days.

(21) Appl. No.: 18/338,260

(22) Filed: Jun. 20, 2023

(65) Prior Publication Data
    US 2024/0430574 A1      Dec. 26, 2024

(51) Int. Cl.
     H04N 23/698      (2023.01)
     B60R 1/26        (2022.01)
     (Continued)

(52) U.S. Cl.
     CPC ............. H04N 23/698 (2023.01); B60R 1/26 (2022.01); G06T 5/50 (2013.01); G06T 7/70 (2017.01);
     (Continued)

(58) Field of Classification Search
     CPC ........ H04N 23/698; H04N 23/90; G06T 7/80; G06T 7/70; G06T 5/50;
     (Continued)

(56) References Cited

U.S. PATENT DOCUMENTS 6,437,823 B1 *   8/2002   Zhang .................. H04N 17/002
                                                            348/188
9,201,424 B1 *  12/2015   Ogale .................. G05D 1/0253
     (Continued)

OTHER PUBLICATIONS

Godard, et al., "Digging Into Self-Supervised Monocular Depth Estimation," Aug. 2019, retrieved from https://arxiv.org/pdf/1806.01260.pdf, 18 pages.
     (Continued)

Primary Examiner — Brian P Yenke
(74) Attorney, Agent, or Firm — BAKERHOSTETLER

(57)          ABSTRACT

Aspects of the subject disclosure relate to a vehicle camera system. A device implementing the subject technology may include a processor configured to detect a first camera on a vehicle and a second camera on the vehicle. The processor can determine a position and a pose of at least one of the first camera or the second camera. The processor also can receive first data from the first camera and second data from the second camera. The processor can stitch the first data with the second data to generate a stitched image having a contiguous field of view based on the position and the pose of the at least one of the first camera or the second camera. Accordingly, seamless integration of cameras between a vehicle and towed objects of various geometries for surround view can be provided.

20 Claims, 11 Drawing Sheets

(51) Int. Cl.

| | | |
|---|---|---|
| *G06T 5/50* | (2006.01) | |
| *G06T 7/70* | (2017.01) | |
| *G06T 7/80* | (2017.01) | |
| *H04N 23/90* | (2023.01) | |

(52) U.S. Cl.
CPC .............. *G06T 7/80* (2017.01); *H04N 23/90* (2023.01); *B60R 2300/105* (2013.01); *B60R 2300/20* (2013.01); *B60R 2300/303* (2013.01); *B60R 2300/802* (2013.01); *G06T 2207/20221* (2013.01); *G06T 2207/30244* (2013.01); *G06T 2207/30252* (2013.01)

(58) Field of Classification Search
CPC . G06T 2207/20221; G06T 2207/30244; G06T 2207/30252; B60R 2300/105; B60R 2300/20; B60R 2300/303; B60R 2300/802; B60R 1/26
See application file for complete search history.

(56) References Cited

U.S. PATENT DOCUMENTS

| | | | | |
|---|---|---|---|---|
| 10,504,241 | B2 * | 12/2019 | Singh | G06T 7/80 |
| 10,549,694 | B2 * | 2/2020 | Murad | B60R 1/26 |
| 10,897,600 | B1 * | 1/2021 | Dabral | H04N 1/2129 |
| 11,158,056 | B2 * | 10/2021 | Lukac | G06T 7/12 |
| 11,348,282 | B1 * | 5/2022 | Averhart | H04N 17/002 |
| 12,002,214 | B1 * | 6/2024 | Chand | H04N 7/181 |
| 2010/0220173 | A1 * | 9/2010 | Anguelov | G06T 7/70 |
| | | | | 348/148 |
| 2013/0002871 | A1 * | 1/2013 | Natroshvili | G06T 7/80 |
| | | | | 348/148 |
| 2013/0258047 | A1 * | 10/2013 | Morimoto | G06T 3/12 |
| | | | | 348/148 |
| 2014/0160249 | A1 * | 6/2014 | Ro | G06T 7/593 |
| | | | | 348/47 |
| 2015/0139556 | A1 * | 5/2015 | Jeon | G06T 7/73 |
| | | | | 382/218 |
| 2015/0324984 | A1 * | 11/2015 | Fey | G06T 7/80 |
| | | | | 348/148 |
| 2015/0329048 | A1 * | 11/2015 | Wang | G06T 7/80 |
| | | | | 348/148 |
| 2017/0280091 | A1 * | 9/2017 | Greenwood | G06T 11/00 |

| | | | | |
|---|---|---|---|---|
| 2017/0341583 | A1 * | 11/2017 | Zhang | H04N 7/181 |
| 2018/0176459 | A1 * | 6/2018 | Choi | G06F 1/163 |
| 2018/0188032 | A1 * | 7/2018 | Ramanandan | G01S 19/52 |
| 2018/0188348 | A1 * | 7/2018 | Wirola | H04W 24/10 |
| 2018/0191954 | A1 * | 7/2018 | Pan | B60R 1/26 |
| 2018/0315244 | A1 * | 11/2018 | Thompson | H04N 23/63 |
| 2019/0206084 | A1 * | 7/2019 | Noble | G06V 40/19 |
| 2019/0349571 | A1 * | 11/2019 | Herman | H04N 23/698 |
| 2020/0294194 | A1 * | 9/2020 | Sun | H04N 23/698 |
| 2020/0358966 | A1 * | 11/2020 | Lee | H04N 23/45 |
| 2021/0024081 | A1 * | 1/2021 | Johnson-Roberson | |
| | | | | G01S 17/89 |
| 2021/0024087 | A1 * | 1/2021 | Kim | B60W 50/14 |
| 2021/0027522 | A1 * | 1/2021 | Dabral | H04N 13/111 |
| 2021/0053490 | A1 | 2/2021 | Smits | |
| 2021/0082149 | A1 * | 3/2021 | Sheorey | G06T 7/85 |
| 2021/0104069 | A1 * | 4/2021 | Tahara | G06T 7/80 |
| 2021/0165418 | A1 * | 6/2021 | Grabner | G06T 7/35 |
| 2021/0225035 | A1 * | 7/2021 | Devitt | G06T 7/50 |
| 2022/0084229 | A1 * | 3/2022 | Guizilini | G06T 3/18 |
| 2022/0084230 | A1 * | 3/2022 | Guizilini | G06T 3/18 |
| 2022/0198714 | A1 * | 6/2022 | del Pero | H04W 4/46 |
| 2023/0024474 | A1 * | 1/2023 | Ren | H04N 5/265 |
| 2023/0319218 | A1 * | 10/2023 | Ren | H04N 5/2624 |
| | | | | 382/284 |
| 2023/0382422 | A1 | 11/2023 | Ferencz | |
| 2023/0410486 | A1 * | 12/2023 | Tian | G06V 20/58 |
| 2024/0177347 | A1 * | 5/2024 | Morishima | H04N 17/002 |
| 2024/0312123 | A1 * | 9/2024 | Anwar | G06T 19/006 |
| 2024/0331197 | A1 * | 10/2024 | Yang | H04N 23/90 |
| 2024/0336200 | A1 * | 10/2024 | Baur | B60R 1/26 |
| 2024/0340545 | A1 * | 10/2024 | Christiansen | B60R 1/27 |
| 2024/0370971 | A1 * | 11/2024 | Arar | G06T 3/4038 |
| 2024/0424988 | A1 * | 12/2024 | Burns | B60R 1/28 |
| 2024/0426623 | A1 * | 12/2024 | Gamalath | H04N 5/2624 |
| 2024/0428545 | A1 * | 12/2024 | Venkatachalapathy | |
| | | | | G06V 10/16 |
| 2025/0078318 | A1 * | 3/2025 | Kappi | G06T 7/70 |
| 2025/0139807 | A1 * | 5/2025 | Zou | G06V 10/44 |
| 2025/0386099 | A1 * | 12/2025 | Lablans | H04N 23/45 |

OTHER PUBLICATIONS

Kendall, et al., "PoseNet: A Convolutional Network for Real-Time 6-DOF Camera Relocalization," Feb. 2016, retrieved from https://arxiv.org/pdf/1505.07427.pdf, 9 pages.

* cited by examiner

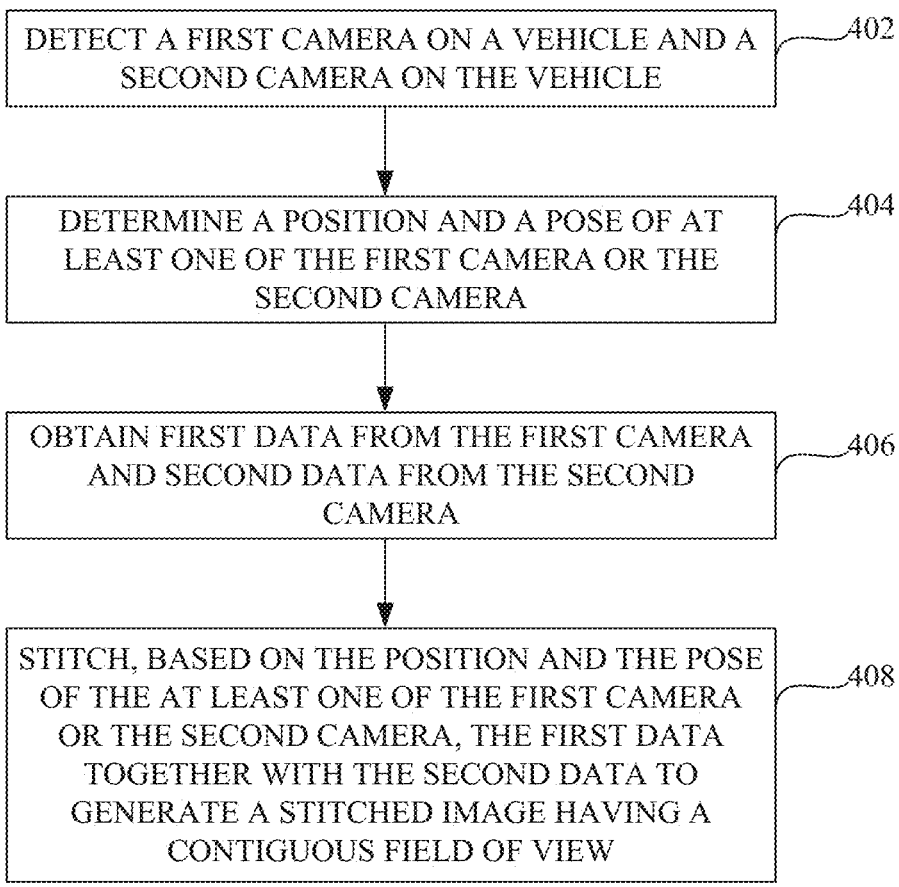

400

```
┌──────────────────────────────────────────────┐
│ DETECT A FIRST CAMERA ON A VEHICLE AND A       │——402
│ SECOND CAMERA ON THE VEHICLE                   │
└──────────────────────────────────────────────┘
                      │
                      ▼
┌──────────────────────────────────────────────┐
│ DETERMINE A POSITION AND A POSE OF AT          │——404
│ LEAST ONE OF THE FIRST CAMERA OR THE           │
│ SECOND CAMERA                                  │
└──────────────────────────────────────────────┘
                      │
                      ▼
┌──────────────────────────────────────────────┐
│ OBTAIN FIRST DATA FROM THE FIRST CAMERA        │——406
│ AND SECOND DATA FROM THE SECOND                │
│ CAMERA                                         │
└──────────────────────────────────────────────┘
                      │
                      ▼
┌──────────────────────────────────────────────┐
│ STITCH, BASED ON THE POSITION AND THE POSE     │——408
│ OF THE AT LEAST ONE OF THE FIRST CAMERA        │
│ OR THE SECOND CAMERA, THE FIRST DATA           │
│ TOGETHER WITH THE SECOND DATA TO               │
│ GENERATE A STITCHED IMAGE HAVING A             │
│ CONTIGUOUS FIELD OF VIEW                       │
└──────────────────────────────────────────────┘
```

*FIG. 4*

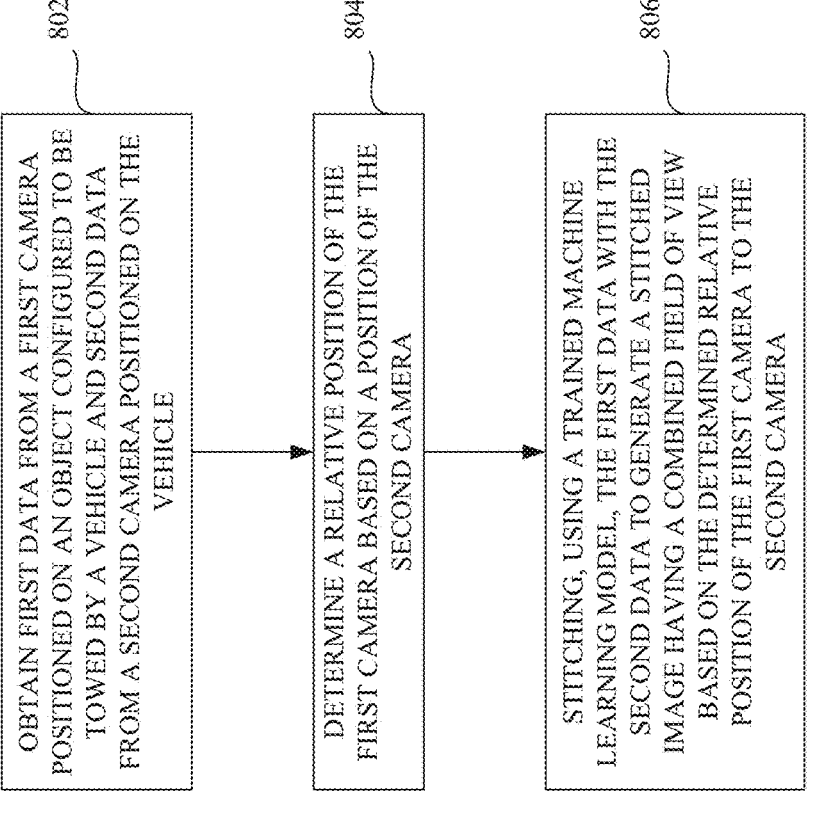

800

802

OBTAIN FIRST DATA FROM A FIRST CAMERA POSITIONED ON AN OBJECT CONFIGURED TO BE TOWED BY A VEHICLE AND SECOND DATA FROM A SECOND CAMERA POSITIONED ON THE VEHICLE

804

DETERMINE A RELATIVE POSITION OF THE FIRST CAMERA BASED ON A POSITION OF THE SECOND CAMERA

806

STITCHING, USING A TRAINED MACHINE LEARNING MODEL, THE FIRST DATA WITH THE SECOND DATA TO GENERATE A STITCHED IMAGE HAVING A COMBINED FIELD OF VIEW BASED ON THE DETERMINED RELATIVE POSITION OF THE FIRST CAMERA TO THE SECOND CAMERA

*FIG. 8*

VEHICLE CAMERA SYSTEM

INTRODUCTION

Vehicles, including electric vehicles, can include camera systems. For example, a vehicle camera system can include seamless integration of external cameras on a vehicle. The vehicle camera system also can include surround view of towed objects of various geometries.

SUMMARY

The present disclosure enhances cameras with fixed placements on a vehicle that may not be optimal locations for visual value, thus potentially omitting views of potential interest to a user. In one instance, an external camera can be mounted onto one of a selection of predefined positions on a vehicle with predefined connections to an image processing system of the vehicle. When a compatible camera is mounted on one of the mounts and connected, the image processing system can recognize the camera and configure the application to account for the camera in the selection of views. The estimated position and pose may already be determined by the predefined positions of the camera. In another instance, an external camera can be mounted arbitrarily onto an external position on the vehicle. The estimated position and pose of the external camera may be estimated using a ranging system and/or inertial measurement unit data. The cameras at the arbitrary vehicle locations may be synchronized with one another over a wireless network. A calibration can be performed on either instance (e.g., predefined positions or arbitrary locations) while the vehicle is moving to calculate the precise position and pose to support stitching of the camera image into images from other vehicle cameras. For example, the pose of each camera may be estimated and calibrated iteratively, and the cameras may be synchronized with one another. The process may include determining the relative position of at least two images with partially overlapping fields of view to thereby determine the camera pose. The camera pose may be continuously tracked to maintain continuous alignment between the images being stitched.

The present disclosure also relates to enhancing vehicle visibility involving the towing of trailers or towed objects where blind spots and difficult angles make the towing challenging by determining the relative position between cameras mounted on a trailer or object being towed and using this information to create a surround view for situations where visibility is limited. A set of cameras (e.g., wired and/or wireless) can be positioned on the trailer or object being towed and the position of an existing fixed-positioned or temporarily-positioned camera on a vehicle can be used to find the relative position of the trailer camera. The process may include determining the relative position of the two images with partially overlapping fields of view to thereby determine the camera pose. The two images can then be stitched together using a trained machine learning algorithm (e.g., deep learning model) based on the determined camera pose between the images. Additionally, the trailer camera can be attached permanently (or non-permanently), and the mounting of the trailer camera is not limited to flat surfaces and can be extended to any plane with overlapping images.

In accordance with one or more aspects of the present disclosure, a method includes detecting, by a processor, a first camera on a vehicle and a second camera on the vehicle; determining, by the processor, a position and a pose of at least one of the first camera or the second camera; receiving, by the processor, first data from the first camera and second data from the second camera; and stitching, based on the position and the pose of the at least one of the first camera or the second camera, the first data together with the second data to generate a stitched image having a contiguous field of view.

In accordance with one or more aspects of the present disclosure, a system is provided that includes memory, and at least one processor coupled to the memory and configured to determine whether a first camera is positioned at a predefined location on a vehicle; determine a position and a pose of the first camera using one or more measurements associated with the first camera when the first camera is not located at a predefined position on the vehicle; receive first data from the first camera; and stitch the first data with second data associated with a second camera on the vehicle to generate a stitched image having a contiguous field of view based at least in part on the position and the pose of the first camera.

In accordance with one or more aspects of the disclosure, a vehicle including a first camera and a second camera that also includes a processor configured to detect a first connection to the first camera and a second connection to the second camera; determine a position of one or more of the first camera or the second camera; determine a post of one or more of the first camera or the second camera; synchronize between the first camera and the second camera; receive, from the first camera, a transmission comprising first data having a first field of view of a scene; and create a stitched image having a contiguous field of view using the first data having the first field of view and the second data having the second field of view based on the position and the pose of at least one of the first camera or the second camera.

In accordance with one or more aspects of the disclosure, a method includes obtaining, by a processor, first data from a first camera mounted on an object configured to be towed by a vehicle and second data from a second camera mounted on the vehicle; determining, by the processor using a trained machine learning algorithm, a relative position of the first camera based on a position of the second camera; and stitching, by the processor using the trained machine learning algorithm, the first data with the second data to generate a stitched image having a combined field of view based on the determined relative position of the first camera to the second camera.

In accordance with one or more aspects of the disclosure, a system is provided that includes memory, and at least one processor coupled to the memory and configured to obtain first data from at least one camera of an object configured to be towed by a vehicle and second data from at least one camera of the vehicle; determine, using a trained machine learning algorithm, a relative position of the at least one camera of the object based on a position of the at least one camera of the vehicle; align, using the trained machine learning algorithm, images in the first data and the second data based on the determined relative position of the at least one camera of the object to the at least one camera of the vehicle; and combine the aligned images to generate a stitched image having a combined field of view.

In accordance with one or more aspects of the disclosure, a vehicle including a first set of cameras that also includes a processor configured to receive first data from at least one camera of a second set of cameras of an object configured to be towed by the vehicle and second data from at least one camera of the first set of cameras of the vehicle; determine, using a trained machine learning algorithm, a set of sub-pixel shift values that represent relative positions of images in the first data and the second data based on a position of the at least one camera of the first set of cameras; align, using the trained machine learning algorithm, the images based on the set of sub-pixel shift values; and combine the aligned images to produce a stitched image having a combined field of view.

BRIEF DESCRIPTION OF THE DRAWINGS

Certain features of the subject technology are set forth in the appended claims.

However, for purpose of explanation, several embodiments of the subject technology are set forth in the following figures.

FIG. 4 illustrates a flow diagram of an example process for seamlessly integrating cameras on a vehicle in accordance with one or more implementations of the subject technology.

FIG. 8 illustrates a flow diagram of an example process for surround view of towed objects having various geometries in accordance with one or more implementations of the subject technology.

DETAILED DESCRIPTION

Figure 1:
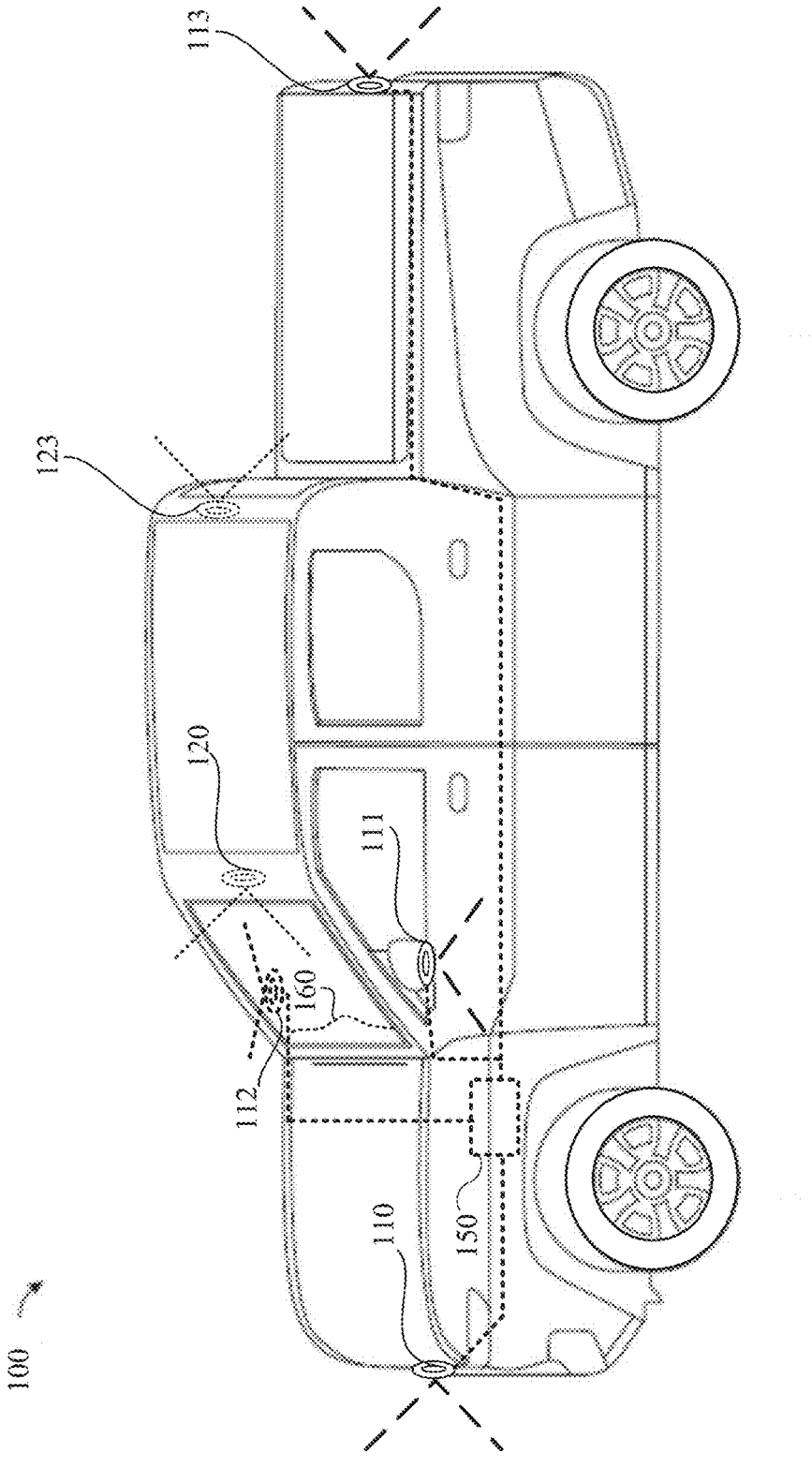
FIG. 1 illustrates a schematic perspective side view of an example implementation of a vehicle including a vehicle camera system in accordance with one or more implementations of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Vehicle Camera System with Seamless Integration of External Cameras

The subject technology enhances the use of cameras with fixed placements on a vehicle. External cameras for visualizing the exterior area of a vehicle rely on cameras with fixed placement. Some prior approaches provide for a user-installed camera to be placed on the rear of a trailer by the user. In this case, the user would need to measure the dimensions of the camera placement, such as the camera pose, and then run a manual calibration routine to refine the measured camera pose, such that the trailer camera image can be stitched together to a wider image captured from the rear-facing camera mounted on the vehicle, and then displayed on an infotainment display of the vehicle. The placement choice is optimized for visual value against the constraint of cost and complexity, which omits several views of potential interest to the user. Existing solutions to this challenging task either do not integrate into the vehicle visual system or else are inflexible point solutions.

In contrast to these prior approaches, the subject technology provides for a seamless integration of an external camera with an automotive infotainment system, allowing external images to be handled by the camera application of the automotive infotainment system, and providing the ability to stitch images from the external camera together with those from the pre-installed cameras on the vehicle. The subject system can calculate the position and/or the pose of the external camera based on at least one fixed camera on the vehicle and/or the trailer, averting the need for a user to provide any estimates for the camera pose and position. When attached to the vehicle or to a trailer, an inertial measurement unit (IMU) of the external camera can provide continuous tracking of the pose of that external camera relative to at least one fixed camera on the vehicle, allowing image stitching to be preserved as the vehicle and trailer go around corners, or even in reverse.

In one or more implementations, the subject system detects, using a processor, a first camera on a vehicle and a second camera on the vehicle. The subject system also determines, using the processor, a position and a pose of each of the first camera and the second camera. The subject system also receives, using the processor, first data from the first camera and second data from the second camera. The subject system also stitches the first data with the second data to generate a stitched image having a contiguous field of view based on the position and the pose of each of the first camera and the second camera.

Accordingly, the subject system enables use of a vehicle camera system with seamless integration of external cameras.

FIG. 1 illustrates a schematic perspective side view of an example implementation of a vehicle 100 including a vehicle camera system in accordance with one or more implementations of the subject technology. For explanatory purposes, the vehicle 100 is illustrated in FIG. 1 as a truck. However, the vehicle 100 is not limited to a truck and may also be, for example, a sport utility vehicle, a van, a delivery van, a semi-truck, an aircraft, a watercraft, a car, a motorcycle, or generally any type of vehicle or other moveable apparatus having a camera system that can integrate one or more external cameras.

The subject technology provides for positioning cameras strategically around the vehicle 100 (as denoted by cameras 120 and 123) to capture images from multiple angles. The vehicle 100 includes cameras 110-113, which may be positioned at fixed and predefined locations on the vehicle 100 to capture images of different areas surrounding the vehicle 100, different fields of view, and the like. For example, the cameras 110-113 on the vehicle 100 can be positioned on the front, back, and sides, such as the camera 110 located at the front of the vehicle 100, the camera 111 located at the left side of the vehicle 100, the third camera 112 located at the right side of the vehicle 100, and the camera 113 located at the rear of the vehicle 100. The cameras 120 and/or 123 may be non-permanently added to the vehicle 100 and can be seamlessly integrated with the cameras 110-113 such that the images captured by the cameras 120 and/or 123 can be stitched together with the images captured by the cameras 110-113 to produce a contiguous field of view surrounding the vehicle 100. The positioning of the cameras 120 and/or 123 can be determined by relying on the relative position of at least one of the fixed cameras 110-113. Although FIG. 1 illustrates cameras 110-113, 120 and 123, it should be appreciated that the vehicle 100 may include an arbitrary number of cameras such that an arbitrary number of external cameras can be seamlessly integrated with an arbitrary number of fixed cameras on the vehicle 100.

The number of cameras used in this configuration may depend on the size of the vehicle 100. In some examples, three cameras can be used for a small vehicle and up to six cameras for a very long vehicle, but the number of cameras seamlessly integrated with the vehicle 100 can be an arbitrary number of cameras depending on the implementation. For example, an additional camera can be placed on each side of the vehicle 100, providing more coverage and reducing blind spots. In some implementations, the system may include a total of 7 cameras, 4 of which are fixed and 3 are wireless. The fixed cameras may be positioned on the vehicle 100 at predefined positions, while the wireless cameras can also be mounted on the vehicle 100 at arbitrary locations that are strategic to capture its surroundings. In some aspects, the wireless cameras can be used for other applications such as off-road under-body camera feed for rock crawling. The cameras intended for use on the vehicle 100 can potentially be designed to withstand harsh environments and extreme conditions, such as dust, dirt, water, and impact resistance. By using multiple cameras on the vehicle 100, the system can capture a wider field of view, allowing the driver of the vehicle 100 to see more of the surroundings and make safer maneuvers.

In one or more implementations, one or more of the cameras 110-113, 120 or 123, one or more of the geo-location sensors 330, and/or other sensors of the vehicle 100 may periodically capture location data to determine a surround view of the vehicle 100. In one or more implementations, one or more of the cameras 110-113, 120 or 123 of the vehicle 100 may periodically capture one or more images, and the vehicle 100 may analyze the images (e.g., via facial recognition) to determine whether an authorized user is visible in the images. The vehicle 100 may also analyze the images (e.g., via object recognition) to determine whether any obstructions are detected as approaching the vehicle 100 along a path trajectory. Where the location data is captured as one or more images (e.g., by the cameras 110-113, 120 or 123), the vehicle 100 may analyze the images to determine whether such obstructions around a vicinity of the vehicle 100 are visible in the images. Where the location data is captured as global positioning system (GPS) data (e.g., by the geo-location sensors 330), the vehicle 100 may analyze the location data with respect to a known route trajectory of the vehicle 100 to determine whether any detected objects are located along the route trajectory of the vehicle 100. In other aspects, the vehicle 100 may analyze the images to determine an omnidirectional visualization of the surroundings of the vehicle 100 and provide a surround view of the vehicle 100.

In some implementations, the vehicle 100 can include an electronic control unit (ECU) 150. Since image stitching can be computationally intensive, the ECU 150 may include a powerful processing unit such as a dedicated graphics processing unit (GPU) or field-programmable gate array (FPGA) to perform the necessary image processing in real-time.

The subject system may use a combination of computer vision techniques and advanced algorithms to accurately track the position and orientation of the vehicle 100. The subject system may receive information about the geometry of the vehicle 100 as input parameters, as well as the surrounding environment. The system also may detect obstacles and other vehicles in the environment, and display them in a surround view image via an infotainment display system 160.

To be usable by drivers, the vehicle camera system would need to provide a clear and intuitive user interface for displaying the stitched images. This could involve integrating the surround view display with existing dashboard displays or providing a separate display dedicated to the surround view. The infotainment display system 160 may potentially include additional features such as object detection or distance estimation to further enhance driver awareness and safety.

As illustrated in FIG. 1, the set of cameras 120 and 113 (e.g., wired or wireless) can be added and mounted on the vehicle 100 by relying on the position of an existing fixed-positioned or non-permanently positioned camera on the vehicle 100 (e.g., at least one of cameras 110-113) to determine the optimal relative position of other, and/or additional, cameras on the vehicle 100 (e.g., at least one of cameras 120 or 123). In some implementations, an external camera (e.g., at least one of cameras 120 or 123) can be added and mounted onto one of a selection of predefined positions on the vehicle 100 with predefined connections to the ECU 150. When a compatible camera is mounted on one of the preinstalled mounts and connected, the infotainment display system 160 can recognize the added camera and configure the camera application to account for the added camera in the selection of views. The estimated position and pose may already be determined by way of the predefined position of the camera. Low latency connectivity for transport of a frame synchronization signal and return of video stream can be exchanged between the camera and the ECU 150 over a wireless network (e.g., Wi-Fi). Alternatively, hardwired connections can be routed from the ECU 150 to the predefined positions within the vehicle 100.

In some implementations, cameras can be mounted arbitrarily and non-permanently on the vehicle 100 using suction cups or flexible brackets, for example. The vehicle 100 may be equipped with a multi-point ultra-wideband (UWB) ranging system for determining the optimal position of a camera added to the vehicle 100. For example, one or more of the cameras 110-113, 120 or 123 can be equipped with a ranging estimator such as an UWB transponder, which allows the camera position to be estimated when mounted on the vehicle 100. For example, the ECU 150 may determine the relative position of one or more of the cameras 110-113, 120 or 123 by determining a position of the one or more cameras 110-113, 120 or 123 using one or more radio frequency signals associated with the UWB transponder in the cameras 110-113, 120 or 123. In some aspects, the ECU 150 may receive a location signal that is output from one or more of the cameras 110-113, 120 or 123. For example, the location signal may indicate location information associated with the vehicle 100. Additionally, one or more of the cameras 110-113, 120 or 123 can be equipped with an IMU, which allows camera pitch to be estimated. For example, the ECU 150 may determine the relative position of one or more of the cameras 110-113, 120 or 123 by determining a pitch of the one or more of the cameras 110-113, 120 or 123 using data from the IMU in the cameras 110-113, 120 or 123.

In some implementations, the subject system provides for a process of calibrating and synchronizing cameras on the vehicle 100 to ensure accurate and consistent imaging data. To ensure that the images are accurately stitched together, it is important that they are captured at the same time. The process also involves addressing various technical challenges, including lens distortion, image correction, and brightness correction. These operations are performed to ensure that the resulting images are of high quality and that the lanes appear straight and free of distortion.

In some implementations, a calibration may be performed between two or more of the cameras 110-113, 120 or 123 on the vehicle 100. Since each camera (or image sensor) would have its own intrinsic parameters such as focal length and distortion coefficients, camera calibration may be necessary to accurately stitch together the images. This could involve capturing calibration images of a known scene or using a calibration pattern to estimate the camera parameters.

In some implementations, a handshake process may be performed between the ECU 150 and each of the cameras 110-113, 120 and 123 during the initial setup to ensure that there is enough overlap between the cameras. This handshake process can involve taking the intrinsic values from each camera and using them to compute or predict the extrinsic values, which refer to the position and orientation of the camera in space.

In some implementations, a time synchronization process may be performed between the cameras 110-113, 120 and 123 on the vehicle 100. To ensure that the images captured by the different cameras are aligned in time and space, a mechanism for camera synchronization may be performed. This may involve using a common clock source or using specialized hardware or software to synchronize the cameras. For example, time synchronization may be performed by knowing the exact time when each image was captured, along with the vehicle speed. The time synchronization process may involve establishing the relative position of each camera with respect to the center of the vehicle 100 using spatial coordinate values, which may represent the relative pose of each camera with respect to the center of the vehicle 100. This information can be used to create an empty sphere, with the center of the sphere aligned with the vehicle center, and the images from each camera are then aligned with the appropriate position on the sphere. This process is designed to ensure that the cameras are synchronized and the resulting images are distortion-free and accurate.

In each of these implementations, the online calibration can continuously track the pose of one or more of the cameras 110-113, 120 or 123. When the camera is equipped with an IMU, the camera pose relative to the vehicle 100 remains accurately tracked within all six dimensions-of-freedom (DoF). In some implementations, the continuous tracking of relative pose allows the external camera image (e.g., images obtained from one or more of the cameras 110-113, 120 or 123) to be continuously aligned with images obtained from other cameras on the vehicle 100 or external to the vehicle 100.

In some implementations, the online calibration can be performed while the vehicle 100 is moving to calculate precise position and pose to support stitching of the camera image into images from other vehicle cameras. For example, the online calibration can be run with the estimates from UWB position and/or the IMU pitch to refine the position and pose sufficient to support stitching with other camera images. For example, the ECU 150 may determine the relative position of one or more of the cameras 110-113, 120 or 123 by performing a calibration of the position determined with the UWB transponder and/or the camera pitch determined with the IMU data to refine the relative position. Camera synchronization can occur either through UWB data transport or through a wireless network using a specified wireless protocol (e.g., Wi-Fi). In some aspects, video image transmission between the different cameras on vehicle 100 can occur over a communication link using a specified wireless protocol (e.g., Wi-Fi).

In some implementations, at least one of the cameras 110-113, 120 or 123 may be wireless. In this regard, a mechanism for wireless communication between the cameras 110-113, 120 and 123 and the ECU 150 may be implemented. This can involve using a wireless protocol such as Bluetooth or Wi-Fi, or using specialized wireless modules such as ZigBee or LoRa for longer-range communication. To ensure reliable transmission of the images over wireless communication, data transfer protocols such as transmission control protocol (TCP) or user datagram protocol (UDP) can be used. These protocols enable error detection and correction, packet retransmission, and other mechanisms to ensure reliable data transfer over unreliable wireless links.

To provide the most comprehensive and accurate surround view, the vehicle camera system may potentially incorporate data from multiple types of sensors in addition to the cameras 110-113, 120 and 123. This can include sensors such as lidar or radar to provide additional depth and distance information, as well as sensors to detect the orientation and movement of the vehicle 100.

Figure 2:
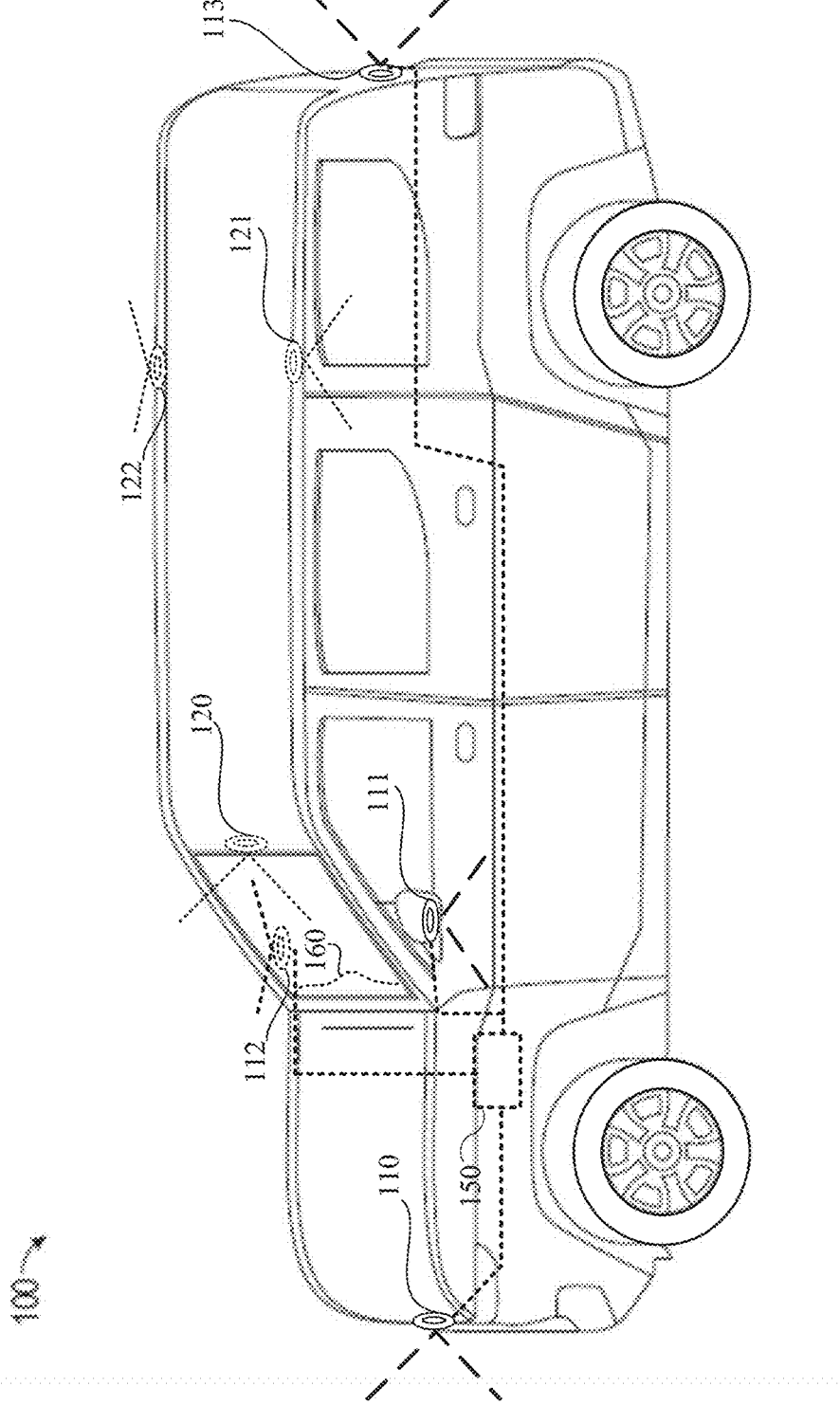
FIG. 2 illustrates a schematic perspective side view of an example implementation of a vehicle including a vehicle camera system in accordance with one or more implementations of the subject technology.

The example of FIG. 1 in which the vehicle 100 is implemented as a pickup truck having a truck bed at the rear portion thereof is merely illustrative. For example, FIG. 2 illustrates another implementation in which the vehicle 100 including a vehicle camera system is implemented as a sport utility vehicle (SUV), such as an electric sport utility vehicle. In the example of FIG. 2, the vehicle 100 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a camera system that can seamlessly integrate one or more external cameras.

In FIG. 2, the vehicle 100 includes cameras 110-113, which may be positioned at fixed and predefined locations on the vehicle 100 to capture images of different areas surrounding the vehicle 100, different fields of view, and the like. The vehicle 100 also includes cameras 120-122, which may be non-permanently added to the vehicle 100 and can be seamlessly integrated with the cameras 110-113 such that the images captured by the cameras 120-122 can be stitched together with the images captured by the cameras 110-113 to produce a contiguous field of view surrounding the vehicle 100. The positioning of the cameras 120-122 can be determined by relying on the relative position of at least one of the fixed cameras 110-113. Although FIG. 2 illustrates cameras 110-113 and 120-122, it should be appreciated that the vehicle 100 may include an arbitrary number of cameras such that an arbitrary number of external cameras can be seamlessly integrated with an arbitrary number of fixed cameras on the vehicle 100.

Example components of a vehicle 100 that is configured with a vehicle camera system are discussed further below with respect to FIG. 3. An example process flow for seamlessly integrating cameras on a vehicle based on a camera pose and position is discussed further below with respect to FIG. 4.

Figure 3:
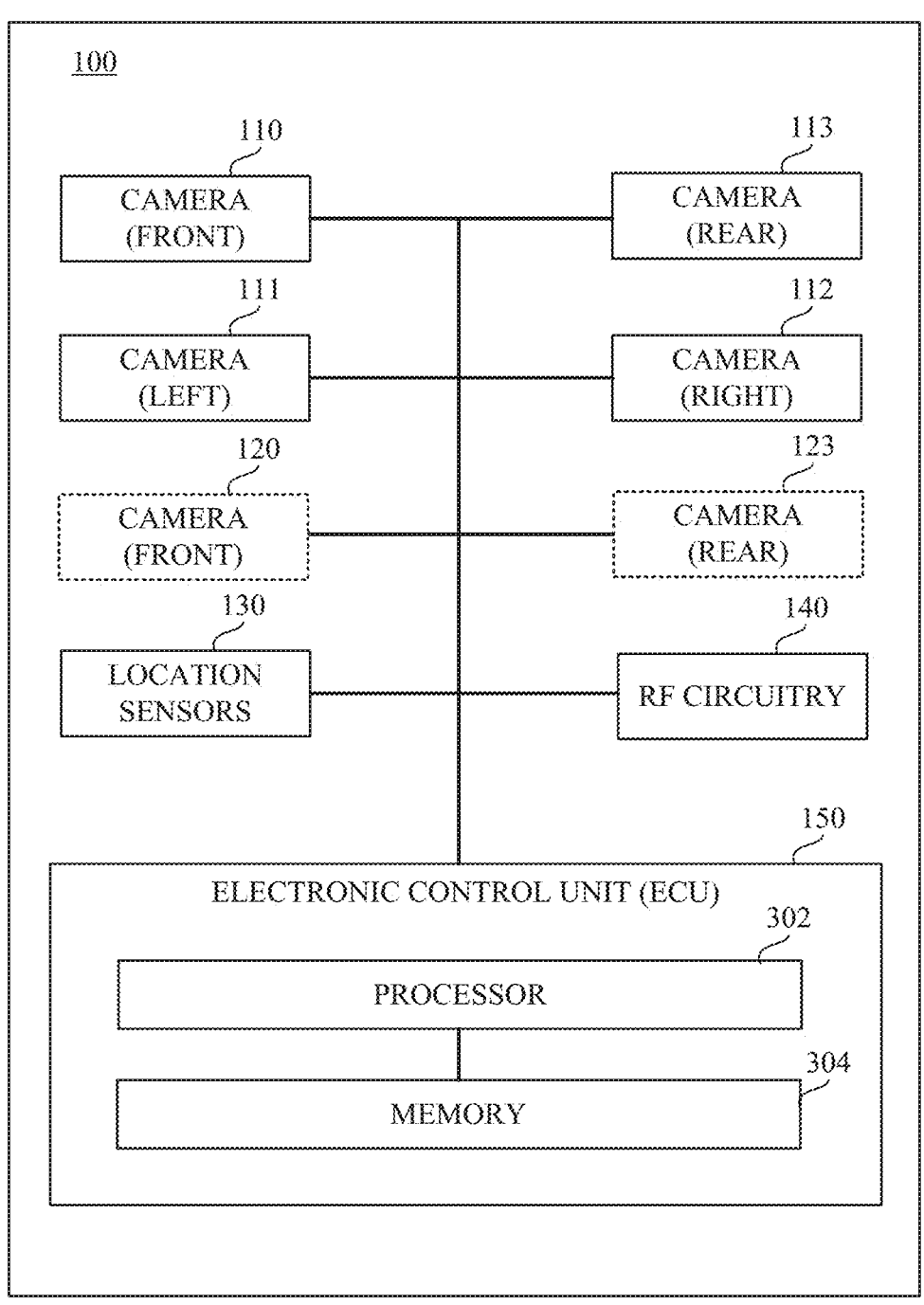
FIG. 3 illustrates a block diagram of an example camera system in a vehicle in accordance with one or more implementations of the subject technology.

FIG. 3 illustrates a block diagram of an example camera system in the vehicle 100 in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The vehicle 100 may include one or more ECUs 150, one or more of the cameras 110-113, 120 or 123, one or more geo-location sensors 330, and radio frequency (RF) circuitry 340. The ECU 150 may include a processor 302 and a memory 304. In one or more implementations, the vehicle 100 may include a processor 302 and/or a memory 304 separate from the ECU 150. For example, the vehicle 100 may not include the ECU 150 and may include the processor 302 as a part or all of a separate semiconductor device. In one or more implementations, vehicle 100 may include multiple ECUs 150 that each control particular functionality of the vehicle 100.

The processor 302 may include suitable logic, circuitry, and/or code that enables processing data and/or controlling operations of the vehicle 100. In this regard, the processor 302 may be enabled to provide control signals to various other components of the vehicle 100. The processor 302 may also control transfers of data between various portions of the vehicle 100. The processor 302 may further implement an operating system, such as a real-time operating system, or may otherwise execute code to manage operations of the vehicle 100.

The memory 304 may include suitable logic, circuitry, and/or code that enable storage of various types of information such as received data, machine learning model data (such as for computer vision and/or other user/object detection algorithms), user authentication data, and/or configuration information. The memory 304 may include, for example, random access memory (RAM), read-only memory (ROM), flash, and/or magnetic storage. In one or more implementations, the memory 304 may store identifiers and/or authentication information of one or more users to determine authorized users and/or authorized authentication devices of the vehicle 100. The memory 304 may also store account information corresponding to an authorized user for exchanging information between the vehicle 100 and a remote server. The memory 304 may also store location data, including the geographic locations of charging stations and the frequency at which one or more charging stations is used to charge the battery. The memory 304 may also store battery data, including an amount of time that has elapsed since the battery was last charged.

The cameras 110-113, 120 and 123 may be, or be included at least in part in, an onboard camera, dashcam, event camera, infrared camera, video camera, or any other type of device that captures digital image representations of a physical environment. The cameras 110-113, 120 and 123 may be used to capture images for detecting and/or recognizing people and/or objects. For example, images captured by at least one of the cameras 110-113, 120 and 123 may be input into a trained facial recognition model for identifying a type of terrain, which may be compared to, for example, a database of terrain types stored in the memory 304.

The RF circuitry 340 may include suitable logic, circuitry, and/or code that enables wired or wireless communication, such as locally within the vehicle 100 and/or between the vehicle 100 and one or more of the cameras 110-113, 120 or 123. The RF circuitry 340 may include, for example, one or more of an UWB interface, a Bluetooth communication interface, a near-field communication (NFC) interface, a Zigbee communication interface, a wireless local area network (WLAN) communication interface, a universal serial bus (USB) communication interface, a cellular interface, or generally any interface for transmitting and/or receiving electronic communications. The RF circuitry 340 can communicate with or otherwise detect other cameras positioned on the vehicle 100, for example by detecting a proximate camera with UWB ranging. In one or more implementations, the geo-location sensors 330 may include suitable logic, circuitry, and/or code that enable motion detection such as movement data and/or vehicle speed data. In one or more other implementations, the geo-location sensors 330 may include an IMU device that measures and reports specific force, angular rate, and/or orientation of the vehicle 100, using a combination of accelerometers, gyroscopes, and magnetometers included in the geo-location sensors 330.

In one or more implementations, one or more of the processor 302, the memory 304, the cameras 110-113, 120, 123, the geo-location sensors 330, the RF circuitry 340, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

FIG. 4 illustrates a flow diagram of an example process 400 for seamlessly integrating cameras on a vehicle in accordance with one or more implementations of the subject technology. For explanatory purposes, the process 400 is primarily described herein with reference to the vehicle 100 of FIGS. 1-3, and/or various components thereof. However, the process 400 is not limited to the vehicle 100 of FIGS. 1-3, and one or more steps (or operations) of the process 400 may be performed by one or more other structural components of the vehicle 100 and/or of other suitable moveable apparatuses, devices, or systems. Further, for explanatory purposes, some of the steps of the process 400 are described herein as occurring in serial, or linearly. However, multiple steps of the process 400 may occur in parallel. In addition, the steps of the process 400 need not be performed in the order shown and/or one or more steps of the process 400 need not be performed and/or can be replaced by other operations.

At step 402, the vehicle 100 may detect, using a processor (e.g., the processor 302), a first camera on the vehicle 100 and a second camera on the vehicle 100. For example, each of the first camera and the second camera may be implemented as one of the cameras 110-113, 120 or 123 of FIG. 1. It is to be understood that the first camera and the second camera can refer to any of the cameras 110-113, 120 or 123 or any additional cameras mounted on the vehicle 100.

In some implementations, cameras may be positioned at fixed locations and predefined connections may coexist between the ECU 150 and the fixed camera positions on the vehicle 100. In this regard, the detecting at step 402 may further include detecting, using the processor 302, the first camera at a first predefined location on the vehicle 100 having a first predefined connection to the processor 302 and detecting, using the processor 302, the second camera at a second predefined location on the vehicle 100 having a second predefined connection to the processor 302.

In some implementations, cameras may be positioned non-permanently at arbitrary positions on the vehicle 100. In this regard, the detecting at step 402, alternatively, may further include detecting, using the processor 302, the first camera at an arbitrary location on the vehicle 100 and detecting, using the processor 302, the second camera at a fixed location on the vehicle 100.

At step 404, the vehicle 100 may determine, using the processor 302, a position and a pose of at least one of the first camera or the second camera. In one aspect, the vehicle 100 may determine, using the processor 302, a position and a pose of the first camera based on a position and a pose corresponding to the fixed location of the second camera. In some implementations, the position and the pose of each of the first camera and the second camera may be predefined based on the first predefined location of the first camera and the second predefined location of the second camera having respective predefined connections to the ECU 150 as described with reference to step 402. In one or more other implementations, the vehicle 100, using the processor 302, may determine the position and the pose of the first camera that is arbitrarily positioned on the vehicle 100 based on the position and the pose of the second camera having a predefined position on the vehicle 100.

In some implementations, the pose of each camera may include determining pitch information of the camera. For example, the determining of the pose of the first camera at step 404 may further include determining a pitch of the first camera using data from an inertial measurement unit in the first camera, and the determining of the pose of the second camera at step 404 may further include determining a pitch of the second camera using data from an inertial measurement unit in the second camera. In some implementations, the position of each camera may include range estimation. For example, the determining of the position of the first camera at step 404 may further include estimating the position of the first camera using one or more radio frequency signal measurements associated with a ranging estimator in the first camera, and the determining the position of the second camera may further include estimating the position of the second camera using one or more radio frequency signal measurements associated with a ranging estimator in the second camera. In some aspects, the ranging estimator may refer to a UWB transponder.

In some implementations, determining the position and the pose of each of the first camera and the second camera as described with reference to step 404 may further include refining the position and the pose of each of the first camera and the second camera by performing a calibration on estimates from the inertial measurement unit and the ranging estimator in each of the first camera and the second camera. In some implementations, the vehicle 100 may further perform a synchronization between the first camera and the second camera over a second wireless network associated with a second wireless protocol. In some aspects, the first wireless protocol is Wi-Fi and the second wireless protocol is UWB. In other aspects, each of the first wireless protocol and the second wireless protocol is Wi-Fi.

At step 406, the vehicle 100 may receive, by the processor, first data from the first camera and second data from the second camera. In some implementations, the first data and the second data may be received over a first predefined connection and a second predefined connection respectively based on predefined connections coexisting between the cameras as described with reference to step 402. In some implementations, the first data and the second data may be received over a first wireless network associated with a first wireless protocol based on arbitrary placement of the cameras as described with reference to step 402.

At step 408, the vehicle 100 may stitch, by the processor, the first data with the second data to generate a stitched image having a contiguous field of view based on the position and the pose of each of the first camera and the second camera.

Figure 5:
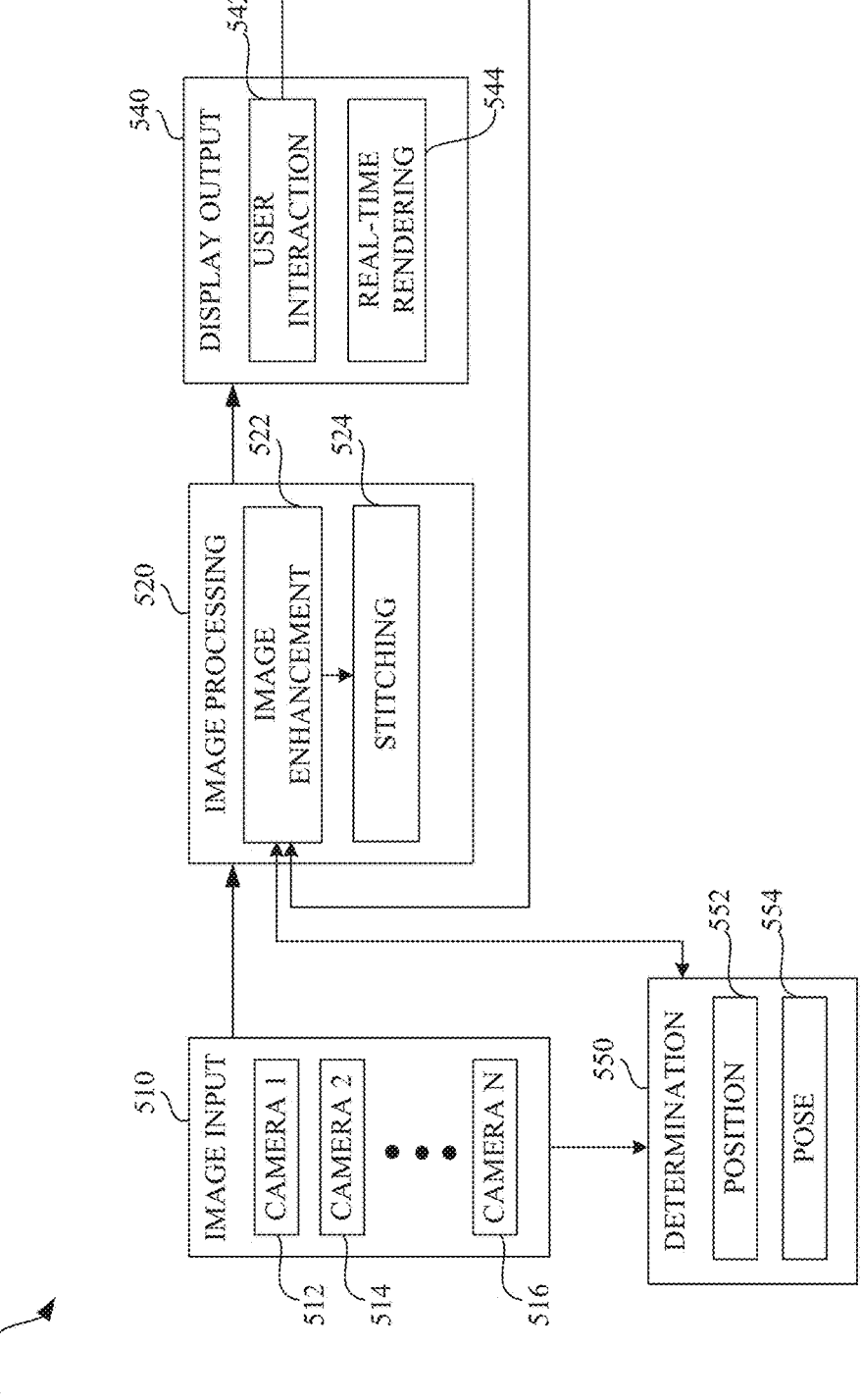
FIG. 5 illustrates a system diagram for seamless integration of external cameras on a vehicle in accordance with one or more implementations of the subject technology.

FIG. 5 illustrates a system diagram 500 for seamless integration of external cameras on a vehicle in accordance with one or more implementations of the subject technology. The system diagram 500 includes an image input component 510 that receives image data from cameras 512, 514 and 516 and feeds the image data to an image processing component 520. The image processing component 520 includes image enhancement component 522 and stitching component 524. The image processing component 520 feeds its output to display output component 540. The display output component 540 includes user interaction component 542 and real-time rendering component 544. The system diagram 500 also includes a determination component 550 that feeds its output to the image processing component 520. The determination component 550 includes a position determination component 552 and a pose determination component 554.

In some aspects, the image input component 510 may receive input images from cameras 512, 514 and/or 516, or from other image data sources. The image input component 510 may perform initialization by initializing sub-components included in the image input component 510 and set up the sub-components, including cameras (e.g., cameras 512, 514, 516), sensors, and processing units. The image input component 510 may capture images from the cameras 512, 514, 516, which may be mounted on the vehicle 100. These cameras may provide different fields of view and/or from different perspectives of the surrounding environment. In some aspects, the image input component 510 may preprocess the captured images to enhance their quality and prepare them for further analysis such as by the image processing component 520. This may involve tasks such as noise reduction, image stabilization, and color correction. In some aspects, the image input component 510 may perform camera calibration to ensure accurate measurements and alignments between the cameras 512, 514, 516.

In some implementations, the determination component 550 may determine the position and/or pose of the cameras 512, 514, 516 and/or other cameras on the vehicle 100 using information from measurement sources, such as ranging estimation data and IMU data. By incorporating measurement data from these sources, the determination component 550 can derive position and/or pose information to perform seamless integration of external cameras added to the vehicle 100. The position determination component 552 can utilize UWB data to calculate the position of at least one of the cameras 512, 514, 516. Similarly, the pose determination component 554 can harness the IMU data, which provides measurements of the camera's pitch, roll, and yaw. In some aspects, the pose determination component 554 may utilize computer vision algorithms and sensor data, such as IMU data to estimate the camera's pose in the world coordinate system. This information can be used to identify the camera's orientation and dynamic movements. For example, the pose determination component 554 can utilize the IMU data to calculate the pose of at least one of the cameras 512, 514, 516.

By knowing the position and/or pose of a camera, the determination component 550 can feed this information to the image processing 520 to help calibrate the positioning between the cameras 512, 514, 516.

In some implementations, the image enhancement component 522 may enhance the quality, clarity, or color of the transformed images to restore fine details and improve overall image quality. For example, the image enhancement component 522 may gather input parameters required for the image enhancement process, which may include the captured images from the vehicle's cameras or any other image source. The image enhancement component 522 may pre-process the captured images to prepare them for enhancement. This may involve tasks such as noise reduction, image denoising, contrast adjustment, and sharpening. The image enhancement component 522 may perform color correction techniques to ensure accurate color representation in the transformed images, which may involve adjusting white balance, color saturation, and other color-related parameters to achieve a more realistic and visually pleasing result. The image enhancement component 522 may adjust the image exposure to optimize brightness and contrast levels, which may involve techniques such as histogram equalization or adaptive exposure adjustment algorithms to enhance the visibility of details in both dark and bright regions of the transformed images. The image enhancement component 522 may apply image filtering algorithms to reduce noise and enhance image details, which may include techniques such as spatial filtering, edge-preserving smoothing, or frequency domain filtering to improve image clarity and sharpness. The image enhancement component 522 may perform dynamic range compression to balance the brightness levels across different areas of the image, which can help to retain details in both the shadows and highlights, avoiding underexposed or overexposed regions in the transformed images. The image enhancement component 522 may apply deblurring or sharpening algorithms to enhance image sharpness and reduce blurriness caused by motion or lens imperfections.

In some implementations, the stitching component 524 may combine or stitch together multiple transformed images to create a panoramic or 360-degree view. The stitching component 524 may align the images from each camera (e.g., cameras 512, 514, 516) into a single panoramic image, where the images are seamlessly blended together to create a complete view of the surrounding environment. This process requires not only understanding the camera poses but also understanding the content of each image and how it relates to the other images. In some aspects, stitching together images from different camera sources and angles involves technical concepts, including camera calibration, feature extraction and matching, homography estimation, and image blending.

In camera calibration, each camera may have its own unique set of intrinsic parameters that determine how it captures the scene. The image processing component 520 may perform the camera calibration by determining these parameters, including the focal length, principal point, and distortion coefficients, which can be used for accurately stitching images together. In feature extraction and matching, the stitching component 524 may find the corresponding points or features between different images to stitch images together. The stitching component 524 may perform the feature extraction by identifying distinctive points or areas in each image, while feature matching involves finding corresponding features across multiple images. For example, the stitching component 524 may need to extract features from the images, such as identifying key points or edges, to help with alignment and stitching.

The stitching component 524 may perform the homography estimation to compute the transformation between the images once corresponding features have been identified between two or more images. Homography is a mathematical model that describes the relationship between two planes in three-dimensional (3D) space, which is used to warp and align the images. After the images have been aligned, image blending is used to create a seamless transition between the stitched images. This involves blending the overlapping regions of the images together to create a seamless, natural-looking panorama. Accordingly, stitching together images from different camera sources and angles may require a combination of image processing, computer vision, and mathematical techniques, as well as an understanding of the intrinsic properties of cameras and how they capture images.

In some implementations, the display output component 540 may provide the stitched images for display on the infotainment display system 160. The user interaction component 542 may enable user interaction to adjust or control the selection of stitched images for display and/or control the presentation of the stitched images via the infotainment display system 160. The real-time rendering component 544 may dynamically update the displayed images in response to user input or stitched image selection updates, providing a real-time interactive experience.

Figure 6:
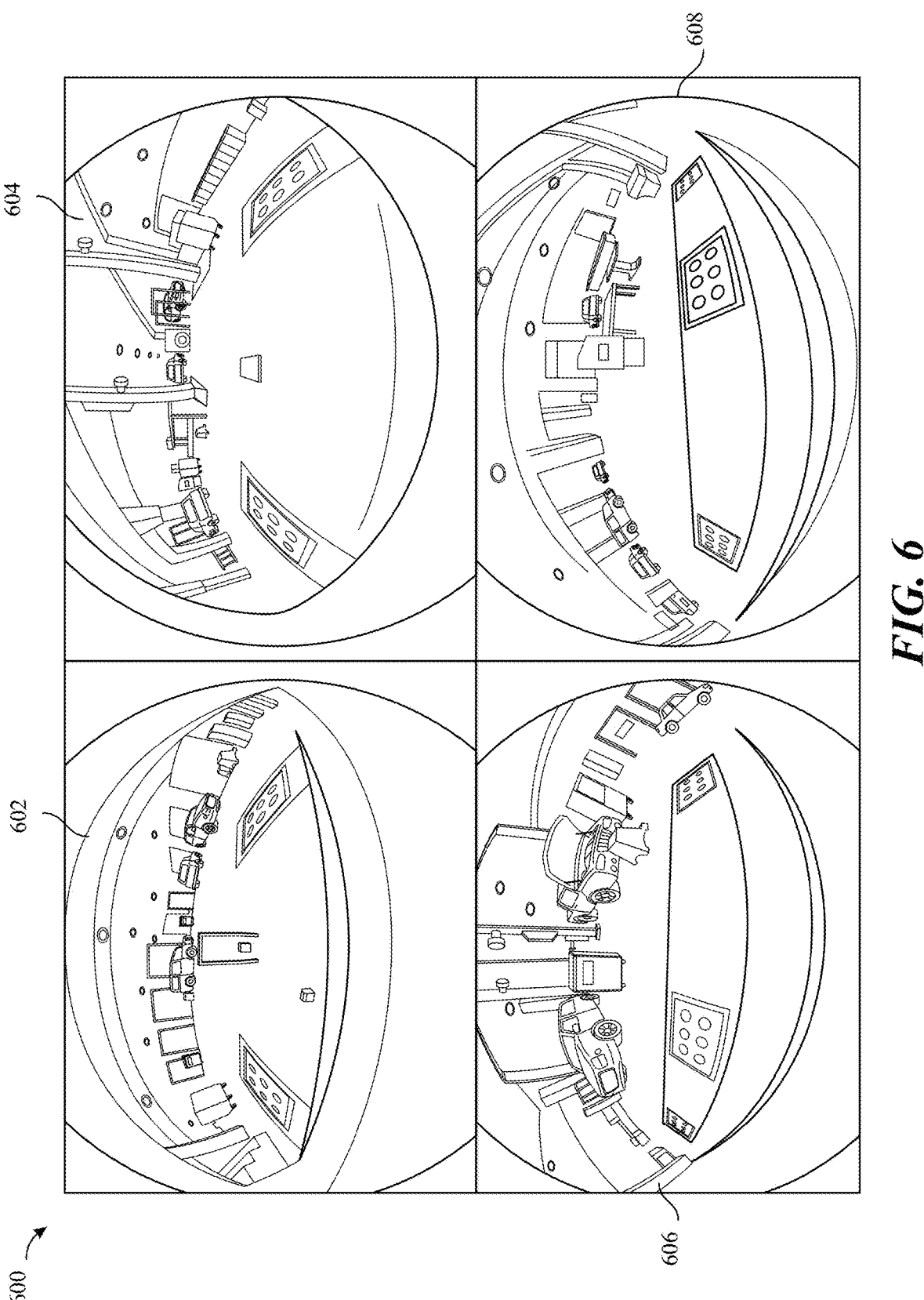
FIG. 6 illustrates an example of camera views from different perspective views in accordance with one or more implementations of the subject technology.

FIG. 6 illustrates an example of camera views from different perspective views in accordance with one or more implementations of the subject technology. These camera views are depicted through four fish lens images. These images provide a visual representation of how the camera system captures the surroundings from various vantage points. These images 602-508 may each serve as an original raw image prior to any stitching operation.

In a first fish lens image 602, the view from the front of the vehicle can be observed. This perspective view may offer a comprehensive look at what lies ahead, allowing the driver to anticipate obstacles or potential hazards in the vehicle's path. In a second fish lens image 604, the view from the rear of the vehicle can be observed. This perspective view may offer information about the vehicles and objects in close proximity, aiding in safe maneuvering of the vehicle in drive mode and parking. A third fish lens image 606 illustrates the view from the left side of the vehicle. This perspective view may enable the driver to gain insight into adjacent lanes and monitor any approaching vehicles or pedestrians from that direction. A fourth fish lens image 608 may provide the view from the right side of the vehicle. This perspective view may complement the left-side view by offering a comprehensive understanding of the vehicle surroundings.

Surround view in the automotive industry can involve using multiple cameras mounted on different parts of a vehicle (e.g., the vehicle 100) to capture a 360-degree view of the surroundings. Traditionally, surround view is visualized as an oval ball, where the images captured by the cameras are projected onto the inner surface of the ball, creating a panoramic view of the vehicle's surroundings. However, this visualization can be improved by building a sphere around the vehicle 100, which allows for a more accurate and realistic image representation of the surroundings. By knowing the position of each camera, a sphere can be built around the vehicle 100, which allows the user to move the vehicle 100 around and see the entire surround view. This can be achieved by using a trained machine learning model, which receives the images as input from multiple cameras and calculates the relative position of each camera. With this information, the position of the vehicle 100 and the surroundings can be accurately represented in the sphere. The sphere may be configurable based on the specific parameters of the vehicle 100. For example, in the rear of the vehicle 100, a separate sphere can be connected to the main sphere to provide a more detailed view of the rear surroundings. By allowing a configurable sphere, it allows for a more tailored and optimized surround view for different types of vehicles and driving scenarios.

To create a 360-degree surround view of the vehicle 100 by stitching images from different perspectives, the process combines multiple images taken from different viewpoints, such as the images 602-508, and projects them onto a spherical surface, thus creating a seamless representation of the vehicle's surroundings. In order to align and stitch the images 602-508, distinctive features are extracted from each image. The extracted features from each image are compared and matched to find corresponding points in different images. Once the images 602-508 are aligned, the process of blending them together begins. To create the final 360-degree surround view, the stitched images are projected onto a spherical surface. A equirectangular projection may be used, where the stitched image is mapped onto a rectangle representing a sphere. The stitched images mapped to the equirectangular projection having planar coordinates may be converted onto a sphere projection having spherical coordinates.

By combining these different perspective views with a stitching operation, the camera system can provide an encompassing 3D surround view from the vehicle's vantage point, enhancing situational awareness and significantly improving the overall driving experience. These fish lens images may exemplify the camera system's capability to capture and process real-time information from multiple angles.

Vehicle Camera System for Surround View of Towed Objects having Various Geometries Implementations of the subject technology described herein also provide for a vehicle camera system for surround view of towed objects having various geometries. For example, the subject technology also relates to enhancing the use case involving towing trailers where blind spots and difficult angles make the towing challenging by determining the position of cameras mounted on a trailer or object being towed and using this information to create a surround view for situations where visibility is limited.

In prior approaches, surround view is only possible with a fixed camera position. The traditional surround view may not extend to other objects being towed (e.g., a trailer or a boat) when a vehicle operates in a tow mode. There may only be a surround view for three sides of the ego vehicle. Surround view between a vehicle and a trailer or object being towed can be a challenging task because of their ability to move independently.

The subject technology provides for having either an extended wired or wireless camera that can be placed anywhere on the trailer either with magnets or fixtures. For example, multiple surround view cameras at fixed positions on the vehicle and any number of additional cameras can be positioned on the trailer. A trained machine learning model can be used to identify the pose between two adjacent cameras, from which partially overlapping images can then be stitched to create the surround view. Accordingly, the subject system can stitch the images from all the cameras to get a holistic view of the vehicle with the trailer or object being towed. The subject technology can help improve the environment perception with additional data from these sensors, especially to automatically control an ego vehicle operating in tow mode.

In one or more implementations, the subject system obtains first data from at least one camera of an object configured to be towed by a vehicle and second data from at least one camera of the vehicle. The subject system determines a relative position of the at least one camera of the object based on a position of the at least one camera of the vehicle. The subject system also creates, using a trained machine learning algorithm, a combined field of view by stitching the first data with the second data to generate a stitched image based on the determined relative position of the at least one camera of the object to the at least one camera of the vehicle.

Accordingly, the subject system enables use of a vehicle camera system for surround view of towed objects having various geometries.

Figure 7:
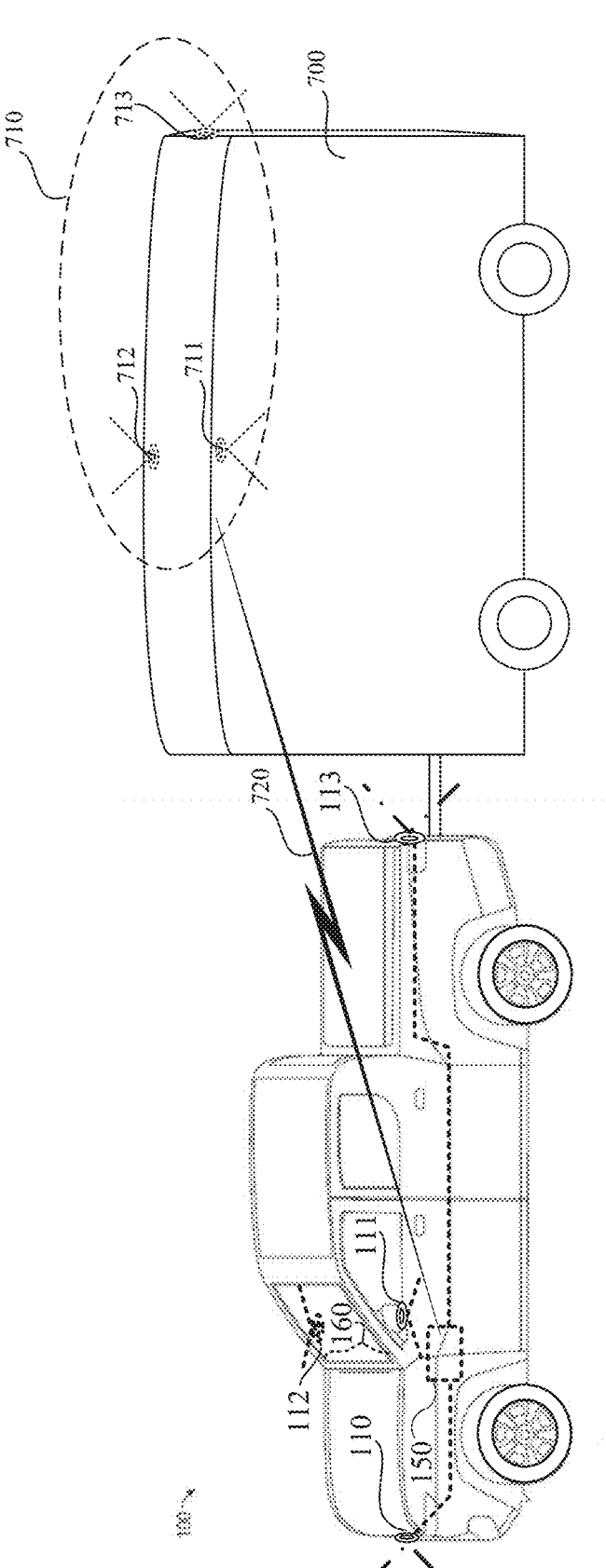
FIG. 7 illustrates an example vehicle including a vehicle camera system for surround view of towed objects having various geometries in accordance with one or more implementations of the subject technology.

FIG. 7 illustrates an example vehicle including a vehicle camera system for surround view of towed objects having various geometries in accordance with one or more implementations of the subject technology. As illustrated in FIG. 7, a vehicle (e.g., the vehicle 100) has a configuration pulling a trailer (e.g., towed object 700). For brevity of explanation, only features that are different from those shown in FIG. 1 will be discussed with reference to FIG. 7.

The concept of surround view involves using multiple cameras to capture images from different angles and stitching them together to provide a 360-degree view of the vehicle's surroundings. This view is often used for parking or navigating in tight spaces, and it can be particularly helpful when pulling a trailer, where visibility can be limited. In this regard, the subject technology may provide for a visualization, where the vehicle 100 and all additional cameras (e.g., cameras 711-113) are mapped onto a circuit, with the vehicle 100 at the center. In this case, the vehicle 100 is pulling the towed object 700, which is represented as a separate entity connected to the vehicle 100.

The subject technology further includes positioning cameras strategically around the towed object 700 (as denoted by cameras 711-713) relative to cameras positioned at fixed locations on the vehicle 100 (as denoted by cameras 110-113) to capture images from multiple angles surrounding the vehicle 100 and the towed object 700. The cameras 110113 on the vehicle 100 can be positioned on the front, back, and sides, while the cameras 711-713 on the towed object 700 can be placed on the sides and/or the rear. The number of cameras used in this configuration may depend on the size of the towed object 700 being pulled by the vehicle 100. In some examples, three cameras can be used for a small trailer and up to six cameras for a very long trailer. For example, two cameras can be placed on each side of the towed object 700, providing more coverage and reducing blind spots. In some implementations, the system may include a total of 7 camera modules, 4 of which are fixed and 3 are wireless. The fixed camera modules may be mounted on the vehicle 100 at strategic positions, while the wireless camera modules can be attached to the towed object 700 to capture its surroundings. In some aspects, the wireless camera modules can be used for other applications such as off-road under-body camera feed for rock crawling. The cameras can potentially be designed to withstand harsh environments and extreme conditions, such as dust, dirt, water, and impact resistance.

By using multiple cameras, the system can capture a wider field of view, allowing the driver of the vehicle 100 to see more of the surroundings and make safer maneuvers. In some aspects, the towed object 700 may be equipped with cameras 711-713, and may operate via a wireless network 710 using a wireless protocol (e.g., Wi-Fi, Bluetooth, or the like).

In some aspects, the surround view can display the vehicle 100 and the towed object 700 separately, but still connected. This would allow a user to see the entire configuration of the vehicle 100 and the towed object 700, and would provide a more accurate image representation of the surroundings. The subject system may process the data from all cameras (e.g., cameras 110-113, 711-713) and create a cohesive image that accurately reflects the position and orientation of the vehicle 100 and the towed object 700.

The subject system may use a combination of computer vision techniques and advanced algorithms (e.g., deep learning model) to accurately track the position and orientation of the vehicle 100 and the towed object 700. The subject system may receive information about the geometry of the vehicle 100 and the towed object 700 as input parameters, as well as the surrounding environment.

As illustrated in FIG. 7, a set of cameras 711-713 (e.g., wired or wireless) can be mounted on the towed object 700 (or object) being towed by the vehicle 100 and using the position of an existing fixed-positioned camera on the vehicle 100 (e.g., at least one of cameras 110-113) to find the optimal relative position of the trailer camera (e.g., at least one of cameras 711-713). Low latency connectivity for transport of a frame synchronization signal and return of video stream can be exchanged over the wireless network 710 (e.g., Bluetooth) and to/from the vehicle 100 via a communication link 720. Alternatively, hardwired connections can be routed to the preconfigured positions between the vehicle 100 and the towed object 700.

For explanatory purposes, the vehicle 100 is illustrated in FIG. 7 as a truck and the towed object 700 is illustrated in FIG. 7 as a trailer. However, the vehicle 100 is not limited to a truck and may also be, for example, a sport utility vehicle, a van, a delivery van, a semi-truck, an aircraft, a watercraft, a car, a motorcycle, or generally any type of vehicle or other moveable apparatus. Similarly, the towed object 700 is not limited to a trailer and may also be, for example, a boat, a caravan, a utility trailer, a jet ski or personal watercraft, a horse trailer, a motorcycle trailer, a camper trailer, or generally any type of towed object or other moveable apparatus intended to be towed.

The subject technology provides for the potential to improve the functionality of Advanced Driver Assistance (ADA) features. When towing the towed object 700, the driver's visibility is often limited, making it difficult to use ADAs effectively. However, with the addition of cameras at the sides and the back of the towed object 700, the system can provide a view of the area surrounding the towed object 700, extending the driver's visibility and enabling the use of ADAs that would normally be unavailable while towing. This feature is especially useful in intermodal situations, where the vehicle 100 may need to be used for both towing and regular driving. The surround view of the subject technology involves the use of multiple cameras to create a comprehensive view of the area surrounding the vehicle 100 and the towed object 700 by stitching the images seamlessly based on the predicted pose of each of the cameras. Once all the images have been obtained from all the cameras (e.g., the cameras 110-113, 712, 714, 716), they are fed into a stitch algorithm or a trained deep learning model to run the stitch algorithm, and the resulting visualization is displayed on the vehicle's dashboard or center console such as the infotainment display system 160. The system has the potential to extend the visibility of the driver and improve the functionality of ADAs when towing a towed object.

FIG. 8 illustrates a flow diagram of an example process 800 for surround view of towed objects having various geometries in accordance with one or more implementations of the subject technology. For explanatory purposes, the process 800 is primarily described herein with reference to the vehicle 100 of FIGS. 1, 2, 6 and/or various components thereof. However, the process 800 is not limited to the vehicle 100 of FIG. 6, and one or more steps (or operations) of the process 800 may be performed by one or more other structural components of the vehicle 100 and/or of other suitable moveable apparatuses, devices, or systems. Further, for explanatory purposes, some of the steps of the process 800 are described herein as occurring in serial, or linearly. However, multiple steps of the process 800 may occur in parallel. In addition, the steps of the process 800 need not be performed in the order shown and/or one or more steps of the process 800 need not be performed and/or can be replaced by other operations.

At step 802, the vehicle 100 may obtain, using a processor (e.g., the processor 302), first data from a first camera positioned on an object configured to be towed by the vehicle 100 and second data from a second camera positioned on the vehicle 100. In some aspects, the first data includes an image representation of a scene being observed in a first field of view of an object configured to be towed (e.g., the towed object 600) by the vehicle 100 and the second data includes an image representation of the scene being observed in a second field of view of the vehicle 100.

In some implementations, the processor may receive the first data from the first camera over a wireless network and further receive the second data from the second camera over the same wireless network. In other implementations, the processor may receive the first data from the first camera over a wireless network and further receive the second data from the second camera over a wired communication link between the second camera and the processor. In some implementations, the processor may receive a location signal that is output from either the first camera or the second camera. In some aspects, the location signal may indicate location information associated with the vehicle 100.

At step 804, the vehicle 100 may determine, using a processor (e.g., the processor 302), using a trained machine learning algorithm, a relative position of the first camera based on a position of the second camera. In some aspects, the second camera is located on a vehicle and the first camera is located on an object configured to be towed by the vehicle.

At step 806, the vehicle 100 may stitch, using a processor (e.g., the processor 302), using the trained machine learning algorithm, the first data with the second data to generate a stitched image having a combined field of view based on the determined relative position of the first camera to the second camera. It should be appreciated that although step 806 recites that first data and second data are combined for stitching, all image data produced by all cameras mounted on the vehicle 100 can be combined for stitching. In some implementations, the stitching includes performing a sub-pixel extrapolation using the trained machine learning algorithm. In some implementations, in performing the sub-pixel extrapolation, the processor may determine, using the trained machine learning model, a set of sub-pixel shift values that represent relative positions of images in the first data and the second data and align the images based on the set of sub-pixel shift values. The processor may combine the aligned images to produce the stitched image having the combined field of view.

In some implementations, in determining the set of sub-pixel shift values, the processor may determine whether an amount of overlap between the images is less than an overlap threshold. In other implementations, in determining the set of sub-pixel shift values, the processor may determine a geometric transformation estimate between the images and determine a camera pose of the first camera based on the geometric transformation estimate. In some aspects, the aligning of the images may be based on at least in part the camera pose of the first camera.

Figure 9:
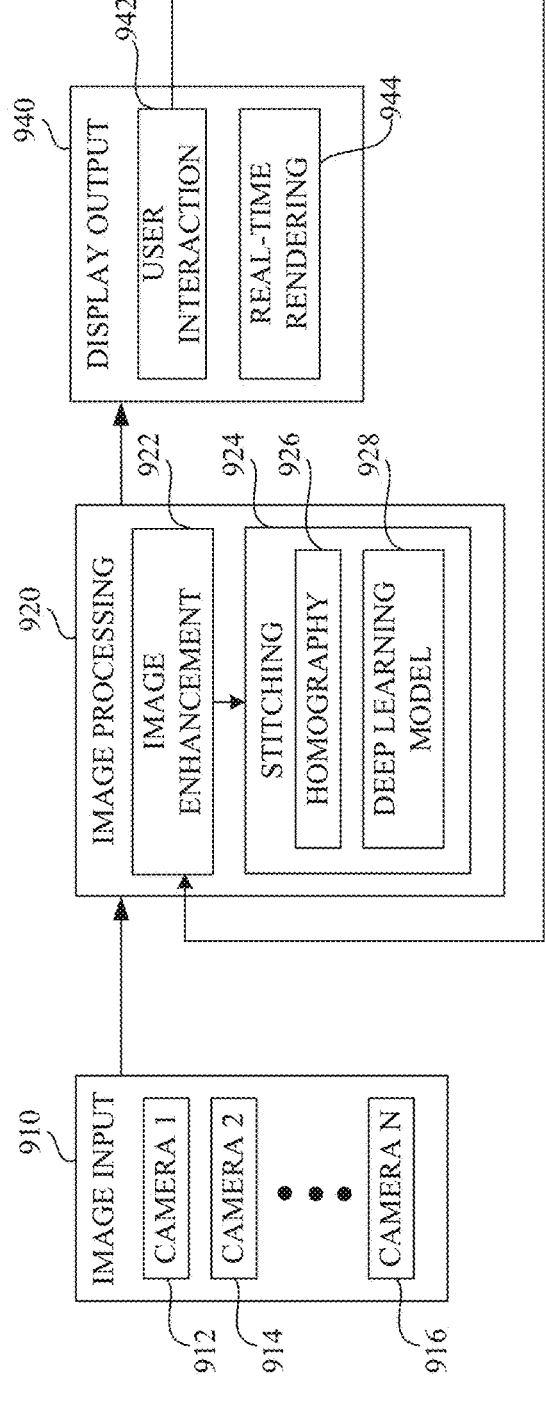
FIG. 9 illustrates a system diagram for surround view of towed objects in accordance with one or more implementations of the subject technology.

FIG. 9 illustrates a flow diagram for surround view of towed objects in accordance with one or more implementations of the subject technology. The flow diagram 900 includes an image input component 910 that receives image data from cameras 912, 914 and 916 and feeds the image data to an image processing component 920. The image processing component 920 includes image enhancement component 922 and stitching component 924. The stitching component 924 includes a homography estimation component 926 and a deep learning model 928. The image processing component 920 feeds its output to display output component 940. The display output component 940 includes user interaction component 942 and real-time rendering component 944.

The image input component 910 may perform initialization by initializing sub-components included in the image input component 910 and set up the sub-components, including cameras (e.g., cameras 912, 914, 916), sensors, and processing units. The image input component 910 may capture images from the cameras 912, 914, 916, which may be mounted on the vehicle 100. These cameras may provide different fields of view and/or from different perspectives of the surrounding environment. In some aspects, the image input component 910 may preprocess the captured images to enhance their quality and prepare them for further analysis such as by the image processing component 920. This may involve tasks such as noise reduction, image stabilization, and color correction. In some aspects, the image input component 910 may perform camera calibration to ensure accurate measurements and alignments between the cameras 912, 914, 916.

In some implementations, the stitching component 924 can stitch together images from different camera sources and angles. For example, the stitching component 924 can perform the stitching process by aligning the images from each camera into a single panoramic image, where the images are seamlessly blended together to create a complete view of the surrounding environment. This process requires not only understanding the camera poses but also understanding the content of each image and how it relates to the other images. In some cases, the stitching component 924 may need to extract features from the images, such as identifying key points or edges, to help with alignment and stitching.

To account for the variation in camera poses on the towed object 700, the stitching component 924 may need to predict or estimate the camera pose at each point in time. This can be done using various techniques, such as using the known pose of the vehicle 100 and the relative position of the towed object 700 to the vehicle 100, as well as using information from the towed object's cameras to estimate its movement and position. Once the camera pose is estimated, the stitching component 924 can use this information to align and stitch the images together.

The process of stitching together images from multiple cameras to create a complete view of the surroundings includes first aligning the images from each camera and then blending them together to create a seamless view. However, this may be only possible when there is no overlap or redundancy in the areas captured by each camera. In the case of the rear camera on the fixed rear location of the vehicle 100, it captures an area that is already covered by the other cameras in the system. Therefore, including its view in the stitched image would lead to overlap and redundancy, making the final view confusing and unclear. To overcome this issue, the information captured by the rear-facing fixed camera on the vehicle 100 may need to be negated or removed from the final stitched view. This can be done by either cropping out the redundant areas from the images captured by the other cameras or by simply ignoring the view provided by the rear camera. The manner of which the rear camera image will be negated may depend on various factors, including the position and quality of the other cameras in the system, the specific requirements of the application, and the computational resources available.

In the stitched camera that combines the views from both the vehicle 100 and the towed object 700, some information may need to be removed to get a complete view. For example, the stitching component 924 can negate images captured from a camera mounted around the rear of the vehicle 100. The reason for this is that the rear camera (e.g., camera 113) is located at the back of the vehicle 100 and does not provide a view of the area that is between the vehicle 100 and the towed object 700. In some aspects, the stitching component 924 can remove the towed object 700 from the surround view, making it appear as if the vehicle 100 is driving without the towed object 700. This could be useful in certain situations, such as when backing up or maneuvering in tight spaces, where it may be difficult to judge the position of the towed object 700.

In some implementations, the homography estimation includes feature descriptors, which would be used to match features between two images. However, when the change in pose is drastic, or the difference in angle is significant, challenges may arise that may be solved by using a trained machine learning algorithm, such as the deep learning model 928.

As such, the subject technology provides for the use of the deep learning model 928 in the stitch algorithm used for camera positioning by the stitching component 924. The deep learning model 928 may be capable of predicting depth between two images, even when the images are taken seconds apart. This may not be possible with non-machine learning based computer vision techniques, which rely on hand-coded feature descriptors. The accuracy of homography is defined by how accurate the pixel features or descriptors are, and since these are hand-coded, the number of feature detectors and descriptors is limited. In contrast, the deep learning model 928 can explore a larger number of dimensions to identify improved features that can distinguish between images.

The deep learning model 928 can also learn to predict camera pose. The concept of camera pose is used primarily in image stitching, as it describes the position and orientation of the camera in relation to the object or scene being captured. The deep learning model 928 can learn to predict camera pose by training on a large dataset of images and their corresponding camera poses. This allows the algorithm to learn the relationship between image features and camera pose, enabling it to predict the camera pose accurately even when there are significant changes in pose or angle.

In some implementations, the deep learning model 928 may be used as a computer vision technique that uses artificial neural networks to automatically stitch together multiple images into a seamless panorama. Unlike traditional image stitching techniques, which rely on feature extraction and matching, the deep learning model 928 can learn to recognize and align features directly from raw image data, without the need for explicit feature extraction.

In some aspects, the deep learning model 928 may include a convolutional neural network (CNN)-based approach. In this approach, a CNN is trained to predict the homography transformation between pairs of input images, using a large dataset of images as training examples. Once the network is trained, it can be used to align and stitch together arbitrary sets of input images, without requiring manual intervention or explicit feature extraction. In other aspects, a deep learning based approach to image stitching may include the use of generative adversarial networks (GANs), which can be trained to generate high-resolution panoramic images by learning to fill in missing regions between input images. GANs can also be used to improve the quality of stitched images by generating high-resolution textures and details that may be missing in the input images.

In other implementations, calibration between the towed object 700 cameras and the vehicle 100 cameras may not be needed when the deep learning model 928 is used. The calibration may not be performed because the trained machine learning model does not require the extrinsic values information as input, but rather the intrinsic information. The intrinsic information may refer to properties of the camera that are unique to each camera, such as lens distortion, focal length, and other aspects that are built into the camera's memory.

In other implementations, the time synchronization may not be performed in a system that uses a deep learning based stitching algorithm for stitching images captured by multiple cameras. For example, time synchronization may be predicted by using the deep learning model 928 that can account for the temporal differences between the images. In the subject system that utilizes the deep learning model 928, time synchronization may be performed in part, or may not be performed at all, because the deep learning model 928 can predict the relative pose between the cameras in the temporal aspect. The deep learning model 928 can identify both the pose of the camera and the velocity vector of the vehicle 100 itself, which allows it to accurately predict the relative differences between images captured at different times.

In stitching, visual perception is more important than the accuracy of the stitch. The goal of stitching may not only be to align images but also to create a seamless and aesthetically pleasing panorama that captures the surrounding environment. By using the aforementioned deep learning techniques, the subject system can overcome image distortion and compression while still maintaining a reasonable level of accuracy in the stitch.

Furthermore, the advantage of using the deep learning model 928 is that it can account for changes in the pose of the camera and the velocity vector of the vehicle 100 over time. For example, even if there is a delay between when an image is captured by one camera and when it is captured by another, the deep learning model 928 can still accurately predict the relative differences between the images.

One of the challenges with synchronizing the cameras is temporal synchronization, which involves ensuring that the images are captured at the same time. This can be difficult to achieve, especially when there are delays between when different cameras capture images. However, the use of the deep learning model 928 can help to address this issue by predicting the relative pose of each camera, even when the images are captured at different times. For example, the deep learning model 928 can predict the relative pose between cameras even in the temporal aspect, accounting for changes in the pose of the camera and the velocity vector of the vehicle 100 over time. The deep learning model 928 may account for the temporal motion of the vehicle 100 and adjust the resulting images accordingly. This results in more accurate image stitching and better overall system performance. As such, the use of the deep learning model 928 for image stitching in a multi-camera system can reduce the need for traditional time synchronization methods. In some implementations, the subject vehicle camera system can provide for tuning parameters, where one such parameter may be the area of overlap between adjacent cameras. The overlap area can allow for common pixels and areas to be seen between the cameras, which can be used for stitching and creating a surround view.

In some implementations, the processor 302 may use the deep learning model 928 to perform the stitching. For example, the processor can perform a sub-pixel extrapolation using the deep learning model 928. Sub-pixel extrapolation using the deep learning model 928 can involve using deep neural networks to estimate sub-pixel shifts between two or more images that are being stitched together. This technique can be used to increase the accuracy of image alignment and to produce a higher quality final stitched image. The processor can feed two or more input images to the deep learning model 928 that has been trained to predict the sub-pixel shifts between them. The deep learning model 928 may be trained on a large dataset of image pairs that have been manually aligned with sub-pixel precision. During training, the deep learning model 928 can learn to recognize patterns in the image pairs that are indicative of sub-pixel shifts, and it adjusts its weights and biases accordingly to improve its predictions.

In the context of sub-pixel extrapolation using the deep learning model 928, homography is used to estimate the geometric transformation between two or more images, which involves determining the rotation, translation, and scaling needed to align the images. This transformation is then used to warp the images into a common coordinate system, which enables the sub-pixel shifts to be estimated accurately. Once the homography transformation has been estimated, it can be used to compute a set of sub-pixel shift values that represent the relative positions of the images with greater accuracy. This is because the homography transformation takes into account the complex geometric relationships between the images, including perspective distortion and other forms of geometric distortion that can affect image alignment.

These sub-pixel shifts are then used to warp the images so that they are aligned with sub-pixel precision. The warped images are then blended together to produce a final stitched image that has a higher level of detail and accuracy than would be possible using traditional stitching techniques. The advantage of using deep-learning techniques for sub-pixel extrapolation is that they can learn and recognize complex patterns in the image data that may not be easily discernible to traditional computer vision algorithms. This allows for more accurate and precise image alignment, resulting in higher quality stitched images.

In some implementations, the processor 302 may determine the set of sub-pixel shift values by determining an amount of overlap between the images that is less than an overlap threshold. In some aspects, the amount of overlap needed between two images may be based on the concept of homography, which may require at least 70 to 70% of overlapping area between two images. In order for homography to work effectively, the overlap between the two images needs to be significant enough to extract meaningful information. In some aspects, the stitching of two images together may require at least partial overlap between the two images such that the two images can still capture different parts of the same scene, so that when they are stitched together, the resulting image shows a wider field of view than either of the individual images. By using the trained machine learning model, the amount of overlap needed may be smaller than what is required in homography. The trained machine learning model may be configured to distill information from smaller overlaps, as long as there is some overlap present. The information extracted from the overlap area is used to determine the differences in the forces acting on the cameras.

In homography estimation, once corresponding features have been identified between two or more images, the homography estimation component 926 can compute the transformation between the images. Homography is a mathematical model that describes the relationship between two planes in 3D space, which is used to warp and align the images. After the images have been aligned, image blending is used to create a seamless transition between the stitched images. This involves blending the overlapping regions of the images together to create a seamless, natural-looking panorama. Accordingly, stitching together images from different camera sources and angles may require a combination of image processing, computer vision, and mathematical techniques, as well as an understanding of the intrinsic properties of cameras and how they capture images.

One of the key factors in the homography estimation is understanding the pose of the cameras, both on the vehicle 100 and on the towed object 700. The pose refers to the position and orientation of the camera relative to the environment. In the case of the vehicle 100, the camera poses are fixed and known, as they are mounted on fixed positions on the vehicle 100. However, in the case of the towed object 700, the camera poses can vary depending on the towed object's movement and position relative to the vehicle 100.

To determine the camera pose, for example, the homography estimation component 926 can estimate the transformation between the camera coordinates and the world coordinates. For example, the homography estimation component 926 can perform homography transformation to map points in the image to corresponding points in the 3D world space, and then using these correspondences to estimate the camera pose.

For example, once the homography transformation is estimated, it can be used to compute the camera intrinsic and extrinsic parameters, which describe the camera's position, orientation, and internal characteristics such as focal length and image sensor size. The camera intrinsic parameters are related to the properties of the camera itself, such as its focal length and image sensor size, while the extrinsic parameters describe the position and orientation of the camera relative to the scene being observed. By estimating these parameters, the homography estimation component 926 can determine the camera pose with respect to the world coordinates of the scene.

In some implementations, the deep learning model 928 can receive two images with an overlap and generate a pose angle for the other camera. In this regard, the deep learning model 928 can estimate the relative position and orientation of one camera with respect to the other camera. This allows the subject system to understand the spatial relationships between multiple cameras and create a cohesive image.

In some implementations, the deep learning model 928 can be configured to estimate the 3D pose of an object or camera from a two-dimensional (2D) image. Once the deep learning model 928 has generated a pose angle for the other camera, this information can be used to determine the relative position and orientation of the two cameras. By knowing the position of one camera and the relative position of the other, the subject system can calculate the absolute position of the second camera. This process can be repeated for all the cameras in the system to create a complete 3D model of the surrounding environment. In this case, the deep learning model 928 can be trained on a large dataset of images with known poses and uses this data to learn how to estimate poses from new images. The deep learning model 928 may include several convolutional layers that extract features from the input image, followed by several fully connected layers that output the pose estimate.

In some aspects, the camera under the mirror produces distorted images with regions that need to be identified for the purpose of stitching. In some implementations, the deep learning model 928 can identify features or characters inside an image and identifying the position of an image in a sub pixel domain. This technique provides fine-grained information about an area between pixels and is used to match images and generate a pose.

In some implementations, the stitching may include at least a 15 to 20% overlap between two images so there is some common area between the two images that can be used to align them properly. If the overlap is less than 15 to 20%, it may pose some challenges to accurately stitch the images together, and the resulting image may have visible seams or other artifacts. The amount of overlap required may depend on the field of view of the cameras used. In particular, if the cameras have a wide field of view, such as 180 to 190 degrees, then it may be sufficient for only 20 or 80 degrees of the field of view to overlap between the two images. This is because even a small amount of overlap in a wide field of view can provide enough information to accurately align the images and create a seamless stitched image.

The amount of overlap required between two images in order for the algorithm to accurately determine the camera pose may be determined by parameters set by the deep learning model 928 rather than being detected by the algorithm itself. Even with a 10% overlap, the deep learning model 928 can detect the camera pose, but the accuracy of the pose may not be refined enough to create the best surround view. In some implementations, the ideal amount of overlap may be around 20%.

In some implementations, the processing of the images takes place on the vehicle 100 itself (e.g., on the ECU 150). This is beneficial as it allows for real-time processing and reduces the latency associated with transmitting the data to a remote server for processing. To facilitate communication between the cameras and the processing unit on the vehicle, wired communication and wireless communication are available. With wired communication, ports can be provided on the vehicle 100, where the wires from the cameras can be plugged in. On the other hand, wireless cameras can be used to stream the data back to the vehicle 100 via the communication link 720. The processing can be carried out on the vehicle 100. This helps reduce the need for transmitting the data to a remote server for processing, which can introduce delays due to the time taken to transmit and process the data. Processing the data on the vehicle 100 can also enable additional functions, such as using the surround view for aid while driving.

One consideration is the amount of data that needs to be transferred, especially since high-resolution images can be quite large. In some aspects, all the data from the towed object 700 may be transferred at once to the vehicle 100 for processing in a surround view system. In other implementations, the data may be transferred in chunks or in bursts to reduce any associated latencies in transferring the data. In other aspects, the data amount of data passed may be reduced or downsized to further reduce any associated latencies.

Although a downsized image can work well for basic functionality, having the original resolution can be beneficial for figuring out the pose of the camera. This means that there may be a trade-off between data transfer speed and the level of detail needed for accurate pose estimation. For example, an eight megapixel camera offset by 120 degrees can used to capture images for stitching. In some aspects, the images may be downsized from eight megapixel to 1.3 megapixel camera, which is a significant compression. However, the deep learning model 928 can still find the pose between the two cameras. The trade-off here is that when working on the full eight megapixel camera, the pose accuracy is improved to the millimeter, which would result in a more accurate stitch.

The subject technology provides for addressing any delay or anomalies in the image data that can cause irregularities in the stitching process, resulting in a distorted view of the surroundings. In one case, wireless cameras used for surround view functionality in the vehicle 100 may experience latency or delay in transmitting the data from the cameras mounted on the towed object 700 to the vehicle 100. For example, high-resolution images can become distorted when projected onto a 3D sphere space, especially around the corners. This means that having better resolution cameras in these areas can help to improve the overall visualization of the surroundings. In some aspects, using a combination of high-resolution and low-resolution cameras may be beneficial to acquire a better view of the surroundings. For example, high-resolution cameras can be used for capturing detailed information around the corners and the low-resolution cameras for the center region, which can be a good compromise between visual clarity and data transmission speed. As a result, a possible solution is to send a mix of high-resolution corners and a lower resolution center region. This would allow for better tuning of the 3D sphere, leading to better visual clarity of the information.

Figure 10:
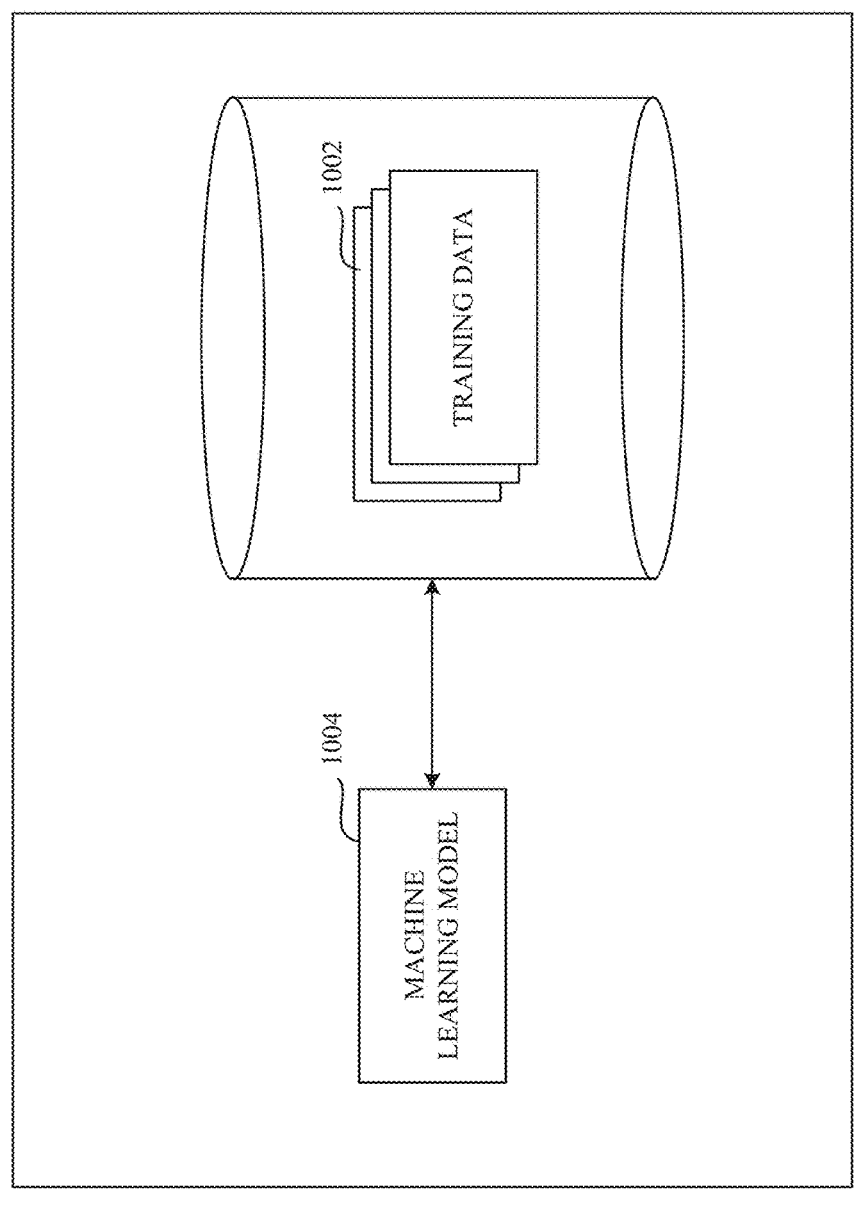
FIG. 10 illustrates an example electronic device that may implement a system for providing a surround view of towed objects in accordance with one or more implementations.

FIG. 10 illustrates an example electronic device 1000 that may implement a system for providing a surround view of towed objects in accordance with one or more implementations. For explanatory purposes, the computing architecture is described as being provided by the electronic device 1000, such as by the processor 302 and/or the memory 304 of the ECU 150. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 1000 includes training data 1002 for training a machine learning model 1004. The electronic device 1000 can perform data pre-processing by pre-processing the collected data to make it suitable for training the machine learning model 1004. This includes data cleaning, normalization, feature extraction, and feature engineering.

The electronic device 1000 can perform model selection by selecting a suitable machine learning algorithm, such as decision trees, neural networks, or support vector machines, that can learn from the pre-processed data and perform the desired actions, such as predicting the camera pose and stitching of partially overlapping images. The electronic device 1000 can perform training of the machine learning model 1004 by training the selected model on the pre-processed data. This involves splitting the data into training, validation, and test sets, setting hyperparameters, and using an optimization algorithm to minimize the model's loss or error on the training data. In an example, the ECU 150 and/or processor 302 may utilize one or more machine learning algorithms that uses the training data 1002 for training the machine learning model 1004.

To train the machine learning model 1004, there are a few approaches that can be taken. One is a supervised approach, where the machine learning model 1004 is trained using labeled data, such as images from cameras that are mounted on fixed positions on the vehicle 100. By knowing the exact position of the cameras at each moment, the machine learning model 1004 can be trained to predict the relationship between two camera images. Another approach is to use the current vehicle's ego motion, which means taking different timestamps of images from different cameras and using the existing vehicle data to train the machine learning model 1004 to predict the pose. This is an unsupervised approach that may not utilize ground truth labels.

There are also mixed ways of training the machine learning model 1004, such as regressing depth from one image and projecting it onto the other camera. This involves taking the front camera and understanding the depth of each pixel, then using that information to project it onto the other camera while knowing the extent of the vehicle in the X direction. This is a semi-supervised learning technique that can be used as well. In some aspects, techniques such as stochastic gradient descent (SGD) or Adam optimization can be used to minimize the loss function and improve the model's performance.

Feature extraction may not be explicitly used as part of the model's training. The machine learning model 1004 can be trained to stitch together the different features it sees at a pixel level using either supervised or unsupervised learning techniques. The goal may be to take the images from different cameras and process them in a way that allows the operator to extend the visibility of the vehicle 100 and the ADA functionalities, which are often limited when towing the towed object 700 of FIG. 7 due to the lack of visibility.

In one or more implementations, the training data 1002 may include training data obtained by a device on which a trained machine learning model is deployed and/or training data obtained by other devices. Training data 1002 may include a large amount of training data that may be required as part of the model training. The training data 1002 may consist of pairs of images that have some degree of overlap, which is used to perform the stitching operation. The pairs of images used for training are often obtained by taking multiple photos of the same scene from different viewpoints or by using a panoramic camera that captures a series of overlapping images as it rotates. The images in each pair are then transformed so that they overlap, and the transformation parameters are recorded. In addition to the input image pairs and their corresponding transformation parameters, the training data 1002 may also include information about the image content, such as edge maps or feature descriptors, which can be used to guide the stitching process. During training, the machine learning model 1004 can learn to predict the transformation parameters that align the input images and produce a seamless output image. The algorithm can be trained using a large number of image pairs, with the aim of minimizing a loss function that measures the difference between the predicted and ground truth transformation parameters. In some aspects, the training process may involve data augmentation techniques, such as cropping, rotation, and scaling, to increase the diversity of the training data and improve the generalization performance of the algorithm.

The system can perform model evaluation by evaluating the trained model on the validation and test sets to ensure that it performs well and generalizes to new data. This includes calculating metrics such as accuracy, precision, recall, and F1-score. The system can perform model deployment once the trained model has been evaluated and validated. Overall, training and implementing the machine learning model 1004 to perform actions in the vehicle camera system may include a combination of data collection, pre-processing, model selection, training, evaluation, and deployment.

Figure 11:
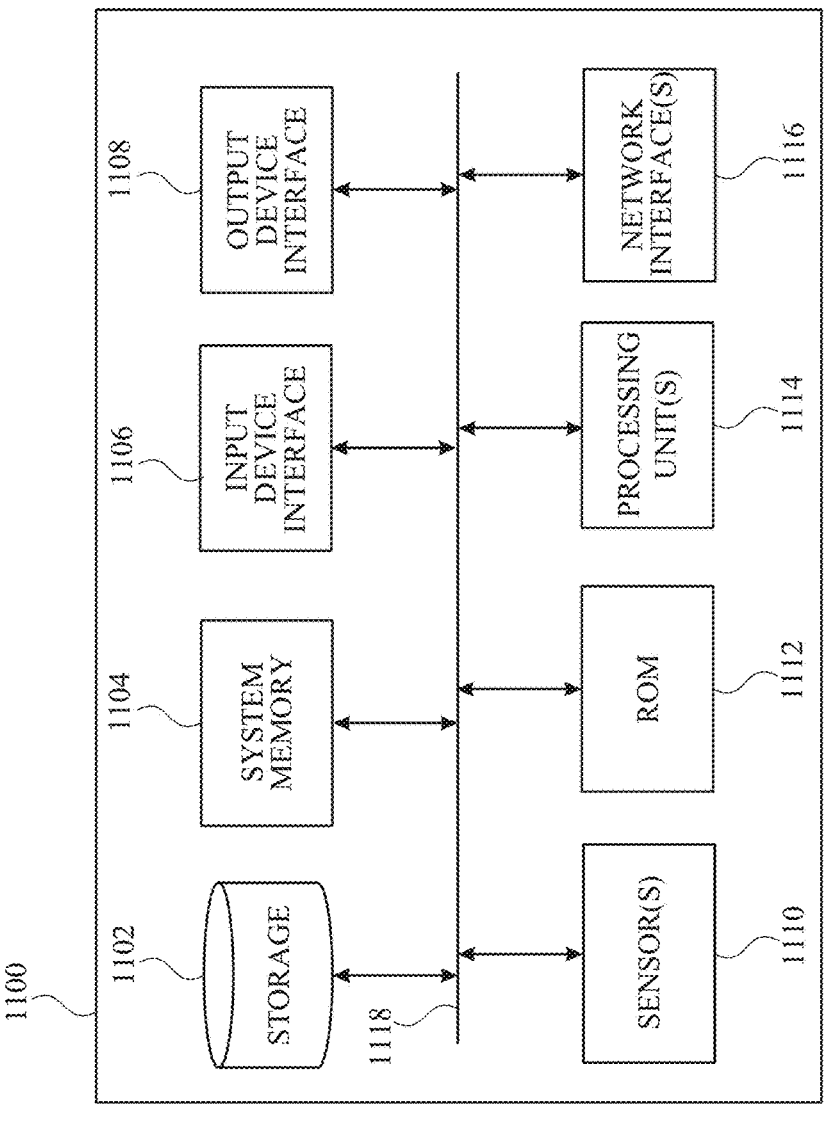
FIG. 11 illustrates an electronic system with which one or more implementations of the subject technology may be implemented.

FIG. 11 illustrates an example electronic system 1100 with which aspects of the present disclosure may be implemented. The electronic system 1100 can be, and/or can be a part of, any electronic device for providing the features and performing processes described in reference to FIGS. 1-10, including but not limited to a vehicle, computer, and server. The electronic system 1100 may include various types of computer-readable media and interfaces for various other types of computer-readable media. The electronic system 1100 includes a persistent storage device 1102, system memory 1104 (and/or buffer), input device interface 1106, output device interface 1108, sensor(s) 1110, ROM 1112, processing unit(s) 1114, network interface 1116, bus 1118, and/or subsets and variations thereof.

The bus 1118 collectively represents all system, peripheral, and chipset buses that communicatively connect the numerous internal devices and/or components of the electronic system 1100, such as any of the components of the vehicle 100 discussed above with respect to FIG. 3. In one or more implementations, the bus 1118 communicatively connects the one or more processing unit(s) 1114 with the ROM 1112, the system memory 1104, and the persistent storage device 1102. From these various memory units, the one or more processing unit(s) 1114 retrieves instructions to execute and data to process in order to execute the processes of the subject disclosure. The one or more processing unit(s) 1114 can be a single processor or a multi-core processor in different implementations. In one or more implementations, one or more of the processing unit(s) 1114 may be included on an ECU 150, such as in the form of the processor 302.

The ROM 1112 stores static data and instructions that are needed by the one or more processing unit(s) 1114 and other modules of the electronic system 1100. The persistent storage device 1102, on the other hand, may be a read-and-write memory device. The persistent storage device 1102 may be a non-volatile memory unit that stores instructions and data even when the electronic system 1100 is off. In one or more implementations, a mass-storage device (such as a magnetic or optical disk and its corresponding disk drive) may be used as the persistent storage device 1102.

In one or more implementations, a removable storage device (such as a floppy disk, flash drive, and its corresponding disk drive) may be used as the persistent storage device 1102. Like the persistent storage device 1102, the system memory 1104 may be a read-and-write memory device. However, unlike the persistent storage device 1102, the system memory 1104 may be a volatile read-and-write memory, such as RAM. The system memory 1104 may store any of the instructions and data that one or more processing unit(s) 1114 may need at runtime. In one or more implementations, the processes of the subject disclosure are stored in the system memory 1104, the persistent storage device 1102, and/or the ROM 1112. From these various memory units, the one or more processing unit(s) 1114 retrieves instructions to execute and data to process in order to execute the processes of one or more implementations.

The persistent storage device 1102 and/or the system memory 1104 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a charging port closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 1118 also connects to the input device interfaces 1106 and output device interfaces 1108. The input device interface 1106 enables a user to communicate information and select commands to the electronic system 1100. Input devices that may be used with the input device interface 1106 may include, for example, alphanumeric keyboards, touch screens, and pointing devices. The output device interface 1108 may enable the electronic system 1100 to communicate information to users. For example, the output device interface 1108 may provide the display of images generated by electronic system 1100. Output devices that may be used with the output device interface 1108 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touch-screen. In these implementations, feedback provided to the user can be any form of sensory feedback, such as visual feedback, auditory feedback, or tactile feedback; and input from the user can be received in any form, including acoustic, speech, or tactile input.

The bus 1118 also connects to sensor(s) 1110. The sensor(s) 1110 may include a geo-location sensor, which may be used in determining device position based on positioning technology. For example, the geo-location sensor may provide for one or more of global navigation satellite system (GNSS) positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 1110 may be utilized to detect movement, travel, and orientation of the electronic system 1100. For example, the sensor(s) may include an accelerometer, a rate gyroscope, and/or other motion-based sensor(s). The sensor(s) 1110 may include one or more biometric sensors and/or cameras for authenticating a user.

The bus 1118 also couples the electronic system 1100 to one or more networks and/or to one or more network nodes through the one or more network interface(s) 1116. In this manner, the electronic system 1100 can be a part of a network of computers (such as a local area network or a wide area network). Any or all components of the electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

32

1. A method comprising:
   determining, by a processor, that a first camera mounted arbitrarily onto an external position on a vehicle includes unknown extrinsic parameters and a second camera integrated into a fixed position on the vehicle includes known extrinsic parameters;
   determining, by the processor, a predicted pose of the first camera that corresponds to at least a portion of the unknown extrinsic parameters using inertial measurement unit (IMU) data associated with the first camera and one or more wireless ranging measurements associated with the first camera;
   continuously tracking, by the processor, the predicted pose of the first camera by performing online iterative calibration of the predicted pose while the vehicle is in motion, the online iterative calibration using the IMU data and the one or more wireless ranging measurements and further using wireless synchronization of timestamps between the first camera, the second camera, and the IMU data to refine the predicted pose of the first camera;
   receiving, by the processor, first data from the first camera and second data from the second camera; and
   stitching, based on the continuously tracked pose of the first camera and a pose of the second camera, the first data together with the second data to generate a stitched image having a contiguous field of view.

2. The method of claim 1, wherein the determining comprises detecting the first camera at a non-fixed location on the vehicle having a wireless connection to the processor and detecting the second camera at a fixed location on the vehicle having a wired connection to the processor.

3. The method of claim 2, wherein the first data and the second data are received over the wireless connection and the wired connection respectively.

4. The method of claim 2, further comprising determining a relative position between the first camera and the second camera based on the non-fixed location of the first camera and the fixed location of the second camera.

5. The method of claim 1, wherein the determining comprises detecting the first camera at an arbitrary location on the vehicle and detecting the second camera at a predefined location on the vehicle, wherein the first data and the second data are received over a first wireless network associated with a first wireless protocol.

6. The method of claim 5, wherein the determining the predicted pose of the first camera further comprises determining a pitch of the first camera using data from an inertial measurement unit in the first camera, wherein the pose of the second camera is predefined based at least in part on the predefined location of the second camera.

7. The method of claim 6, further comprising:
   determining a position of the first camera by estimating the position of the first camera using one or more radio frequency signal measurements associated with a ranging estimator in the first camera; and
   determining a position of the second camera based at least in part on the predefined location of the second camera.

8. The method of claim 7, wherein the determining the position and the pose of each of the first camera and the second camera further comprises refining the position and the pose of each of the first camera and the second camera by performing a calibration on estimates from the inertial measurement unit and the ranging estimator in each of the first camera and the second camera.

9. The method of claim 5, further comprising performing, by the processor, a synchronization between the first camera and the second camera by continuously tracking the pose of each of the first camera and the second camera relative to a center of the vehicle while the vehicle is in motion, wherein the synchronization between the first camera and the second camera is performed over a second wireless network associated with a second wireless protocol.

10. The method of claim 9, wherein the first wireless protocol is Wi-Fi and the second wireless protocol is ultra-wideband (UWB).

11. The method of claim 9, wherein each of the first wireless protocol and the second wireless protocol is Wi-Fi.

12. A system comprising:

memory; and at least one processor coupled to the memory and configured to:

determine that a first camera positioned at an arbitrary location on a vehicle includes unknown extrinsic parameters;

determine a predicted pose of the first camera that corresponds to at least a portion of the unknown extrinsic parameters using inertial measurement unit (IMU) data associated with the first camera and one or more wireless ranging measurements associated with the first camera;

continuously track the predicted pose of the first camera by performing online iterative calibration of the predicted pose while the vehicle is in motion, the online iterative calibration using the IMU data and the one or more wireless ranging measurements and further using wireless synchronization of timestamps between the first camera, a second camera, and the IMU data to refine the predicted pose of the first camera;

receive first data from the first camera; and stitch the first data with second data associated with the second camera to generate a stitched image having a contiguous field of view based at least in part on a position and the continuously tracked pose of the first camera.

13. The system of claim 12, wherein a position and the pose of the first camera are unknown when the first camera is mounted arbitrarily at an external position on the vehicle.

14. The system of claim 13, wherein the first data is received over a wireless connection with the at least one processor from the external position on the vehicle.

15. The system of claim 12, wherein the first data is received over a first wireless network associated with a first wireless protocol when the first camera is mounted arbitrarily at an external position on the vehicle.

16. The system of claim 15, wherein the at least one processor is further configured to perform a synchronization between the first camera and the second camera on the vehicle by continuously tracking the pose of each of the first camera and the second camera relative to a center of the vehicle while the vehicle is in motion, wherein the synchronization between the first camera and the second camera is performed over a second wireless network associated with a second wireless protocol.

17. The system of claim 16, wherein the first wireless protocol is Wi-Fi, and the second wireless protocol is ultra-wideband (UWB).

18. The system of claim 16, wherein each of the first wireless protocol and the second wireless protocol is Wi-Fi.

19. The system of claim 12, wherein the predicted pose of the first camera is further determined using one or more measurements associated with the first camera that comprises one or more of data from an inertial measurement unit (IMU) in the first camera or radio frequency signal measurements associated with a ranging estimator in the first camera.

20. A vehicle, comprising:

a first camera;

a second camera; and a processor configured to:

detect a first connection to the first camera and a second connection to the second camera;

determine that the first camera is mounted arbitrarily onto an external position of the vehicle with unknown extrinsic parameters and the second camera is integrated into a fixed position on the vehicle with known extrinsic parameters;

determine a predicted pose of the first camera that corresponds to at least a portion of the unknown extrinsic parameters using inertial measurement unit (IMU) data associated with the first camera and one or more wireless ranging measurements associated with the first camera;

continuously track the predicted pose of the first camera by performing online iterative calibration of the predicted pose while the vehicle is in motion, the online iterative calibration using the IMU data and the one or more wireless ranging measurements and further using wireless synchronization of timestamps between the first camera, the second camera, and the IMU data to refine the predicted pose of the first camera;

receive, from the first camera, a transmission comprising first data having a first field of view of a scene;

receive, from the second camera, a transmission comprising second data having a second field of view of the scene; and create a stitched image having a contiguous field of view using the first data having the first field of view and the second data having the second field of view based on a position and the continuously tracked pose of the first camera.

* * * * *